(12) United States Patent
Mou et al.

(10) Patent No.: US 11,746,772 B2
(45) Date of Patent: Sep. 5, 2023

(54) MINIATURE FLUID TRANSPORTATION DEVICE

(71) Applicant: Microjet Technology Co., Ltd., Hsinchu (TW)

(72) Inventors: Hao-Jan Mou, Hsinchu (TW); Chung-Wei Kao, Hsinchu (TW); Shih-Chang Chen, Hsinchu (TW); Chi-Chang Yang, Hsinchu (TW); Jyun-Yi Jhang, Hsinchu (TW); Chi-Feng Huang, Hsinchu (TW); Yung-Lung Han, Hsinchu (TW); Chang-Yen Tsai, Hsinchu (TW); Wei-Ming Lee, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 96 days.

(21) Appl. No.: 17/391,911

(22) Filed: Aug. 2, 2021

(65) Prior Publication Data
US 2022/0099084 A1 Mar. 31, 2022

(30) Foreign Application Priority Data
Sep. 25, 2020 (TW) .................................. 109133379

(51) Int. Cl.
*F04B 45/047* (2006.01)
*F04B 43/04* (2006.01)
(Continued)

(52) U.S. Cl.
CPC ............ *F04B 45/047* (2013.01); *F04B 41/06* (2013.01); *F04B 43/046* (2013.01);
(Continued)

(58) Field of Classification Search
CPC ...... F04B 41/06; F04B 43/046; F04B 45/047; F04B 45/043; F04B 49/035; F16K 99/0015; F16K 99/0048; F16K 2099/0094
See application file for complete search history.

(56) References Cited

U.S. PATENT DOCUMENTS

| 2002/0117643 | A1 | 8/2002 | Winger et al. |
| 2008/0077068 | A1 | 3/2008 | Orr |
| 2020/0400136 | A1* | 12/2020 | Pinkerton ............. F04B 43/046 |

FOREIGN PATENT DOCUMENTS

| CN | 101542122 B | 5/2011 |
| CN | 112128088 A * | 12/2020 |

(Continued)

*Primary Examiner* — Charles G Freay
(74) *Attorney, Agent, or Firm* — Birch, Stewart, Kolasch & Birch, LLP

(57) ABSTRACT

A miniature fluid transportation device is provided and includes a convergence component, a valve component, an outlet plate and a plurality of fluid transportation actuation components. The plurality of fluid transportation actuation components are disposed on the convergence component so as to transport the fluid to the convergence component. The convergence component guides the fluid transported by the fluid transportation actuation components to the outlet plate through the valve component. The outlet plate guides the fluid from different transportation actuation components back to the convergence component by a separation guiding block. The fluid is converged in a convergence central slot of the convergence component and is discharged out through a collection channel of the outlet plate. Consequently, the problem of interference owing to the convergence of the fluid transported by different fluid transportation actuation components can be avoided.

17 Claims, 32 Drawing Sheets

(51) Int. Cl.
*F04B 41/06* (2006.01)
*F16K 99/00* (2006.01)
*F04B 45/04* (2006.01)
*F04B 49/035* (2006.01)

(52) U.S. Cl.
CPC .......... *F04B 45/043* (2013.01); *F04B 49/035* (2013.01); *F16K 99/0015* (2013.01); *F16K 99/0048* (2013.01); *F16K 2099/0094* (2013.01)

(56) References Cited

FOREIGN PATENT DOCUMENTS

| | | |
|---|---|---|
| JP | 2018-123796 A | 8/2018 |
| TW | M555405 U | 2/2018 |
| TW | M581637 U | 8/2019 |

* cited by examiner

MINIATURE FLUID TRANSPORTATION DEVICE

FIELD OF THE INVENTION

The present disclosure relates to a miniature fluid transportation device, and more particularly to a miniature fluid transportation device capable of combining a plurality of fluid transportation actuation components without interference with each other.

BACKGROUND OF THE INVENTION

Currently, products in each field, such as pharmaceutical industries, computer techniques, printing industries or energy industries, are developed toward elaboration and miniaturization, and the fluid transportation devices are the crucial components for these products. In order to improve the transportation efficiency, it is desired to combine plural miniature fluid transportation devices. However, the plural miniature fluid transportation devices may interfere with each other as they are combined. For example, the air pressure of the miniature fluid transportation device with lower transportation efficiency is lower, therefore the fluid in the miniature fluid transportation device with higher transportation efficiency tends to flow toward the miniature fluid transportation device with lower transportation efficiency. Therefore, the output efficiency of the combined miniature fluid transportation devices may even be lower than that of a single miniature fluid transportation device.

In view of this problem, how to avoid the interference among the combined miniature fluid transportation devices is a problem needs to resolve right now.

SUMMARY OF THE INVENTION

An object of the present disclosure is to provide a miniature fluid transportation device capable of avoiding the interference among the fluid transportation actuation components.

In accordance with an aspect of the present disclosure, a miniature fluid transportation device includes a convergence component, a valve component, an outlet plate and a plurality of fluid transportation actuation components are provided. The convergence component includes a plurality of carrying regions, a plurality of convergence passages, a plurality of convergence slots, a convergence central slot, a communication slot and a convergence side slot. The plurality of carrying regions are corresponding in position to and in fluid communication with the plurality of convergence passages one-to-one. A convex element is disposed in the convergence passage. The plurality of convergence slots are in fluid communication with the convergence central slot through the communication slot. A convergence convex is disposed at a center of the convergence central slot. One side of the convergence central slot is extended and in fluid communication with the convergence side slot. The valve component is stacked on the convergence component and includes a plurality of passage valve regions, a plurality of convergence-slot valve regions, a convergence-central-slot valve region and a through side slot. Surfaces of the plurality of passage valve regions, the plurality of convergence-slot valve regions and the convergence-central-slot valve region are lower than a surface of the valve component. The plurality of passage valve regions are corresponding in position to the plurality of convergence passages one-to-one. Each of the plurality of passage valve regions is provided with a valve aperture, and the valve aperture is corresponding in position to and abuts against the convex element of the corresponding convergence passage. The plurality of convergence-slot valve regions are corresponding in position to the plurality of convergence slots one-to-one. The convergence-central-slot valve region is corresponding in position to the convergence central slot and is provided with an opening. The opening is corresponding in position to and abuts against the convergence convex of the convergence central slot. The through side slot is corresponding in position to the convergence side slot. The outlet plate is assembled with the convergence component. The valve component is positioned between the convergence component and the outlet plate. The outlet plate includes a plurality of guiding slots, a plurality of pressure-relief slots, a convergence outlet slot, a pressure-relief communication slot and a collection channel. The plurality of guiding slots are corresponding in position to the plurality of passage valve regions one-to-one. A separation guiding block is disposed between each of the plurality of guiding slots for separating the plurality of guiding slots, and the separation guiding block is corresponding in position to the through side slot. The plurality of pressure-relief slots are corresponding in position to the plurality of convergence-slot valve regions one-to-one. The convergence outlet slot is corresponding in position to the convergence-central-slot valve region. The plurality of pressure-relief slots are in fluid communication with the convergence outlet slot through the pressure-relief communication slot. Each of the plurality of compression slots is provided with a pressure-relief convex, and a pressure-relief hole is disposed at a center of the pressure-relief convex. The pressure-relief convex abuts against the convergence-slot valve region and seals the pressure-relief hole. The convergence outlet slot is in fluid communication with the collection channel. Each of the plurality of fluid transportation actuation components is disposed on and seals the corresponding carrying region of the convergence component, and is configured to actuate and transport fluid. Each of the plurality of fluid transportation actuation components actuates and transports the fluid into each of the plurality of convergence passages of the convergence component so as to push each of the plurality of passage valve regions of the valve component, thereby separating the valve aperture of the passage valve region from the convex element of the convergence passage and opening the valve aperture, and allow the fluid flows into each of the plurality of guiding slots of the outlet plate and then into the through side slot through the guiding of the separation guiding block. Afterwards, the fluid is converged in the convergence central slot of the convergence component through the convergence side slot. The fluid pushes the opening of the convergence-central-slot valve region to be separated from the convergence convex of the convergence central slot, and makes the opening open. Meanwhile, the fluid in the convergence central slot flows into the plurality of convergence slots through the communication slot, pushes each of the plurality of convergence-slot valve regions to seal the pressure-relief hole, and then the fluid converged in the convergence outlet slot is collecting to be discharged out through the collection channel.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Please refer to FIG. 1A to FIG. 2B. The present disclosure provides a miniature fluid transportation device 1A including a convergence component 1, a valve component 2, an outlet plate 3 and a plurality of fluid transportation actuation components 4. In addition, for the miniature fluid transportation device 1A, the length L is between 16~32 mm, the width W is between 8~16 mm, and the thickness T is between 1.7~3.5 mm.

Figure 1A:
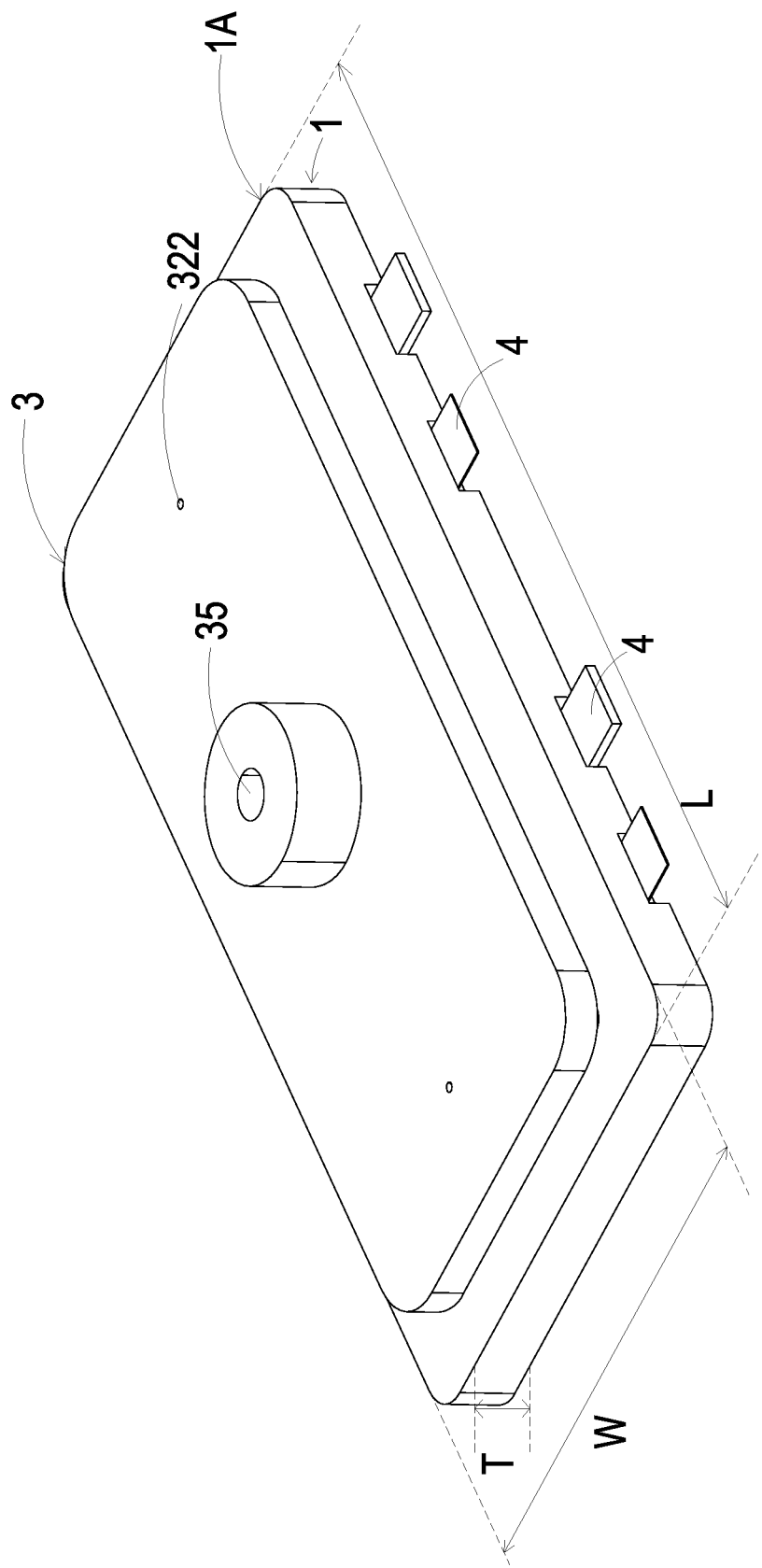
FIG. 1A is a schematic perspective view illustrating a miniature fluid transportation device according to an embodiment of the present disclosure.
Figure 1B:
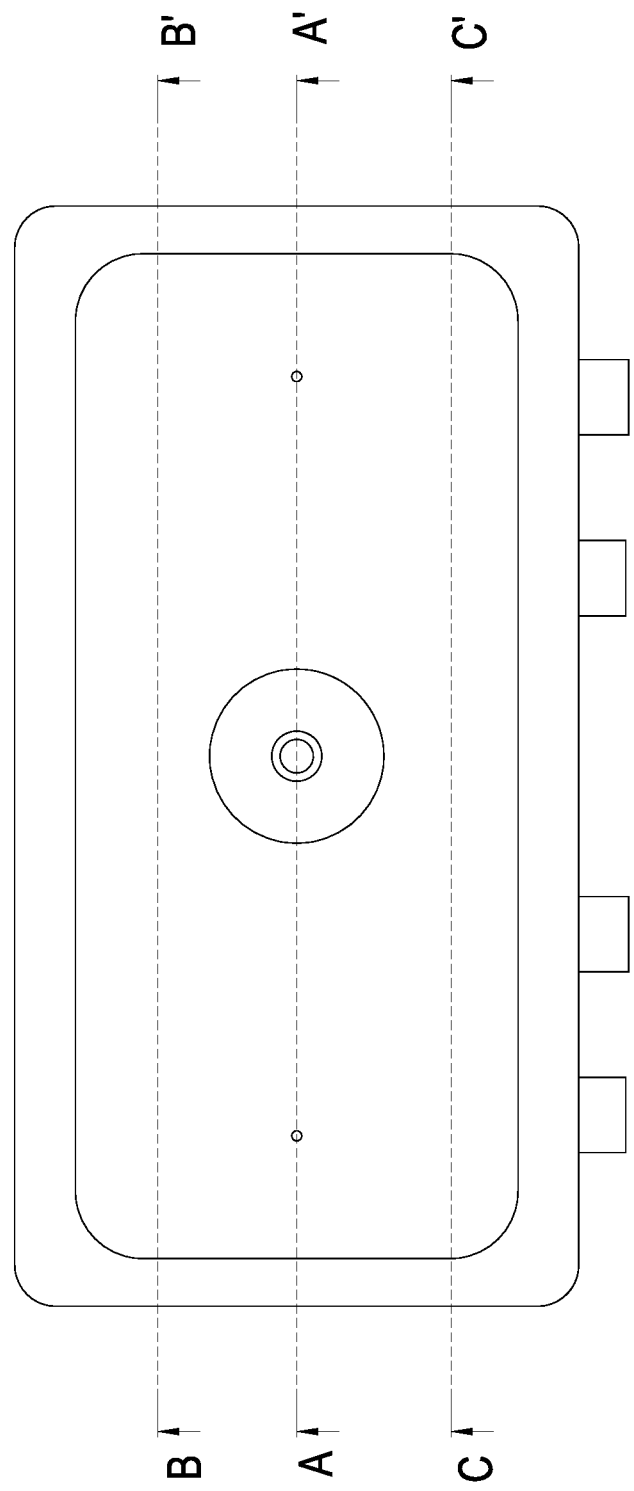
FIG. 1B is a top view illustrating the miniature fluid transportation device according to the embodiment of the present disclosure.
Figure 2A:
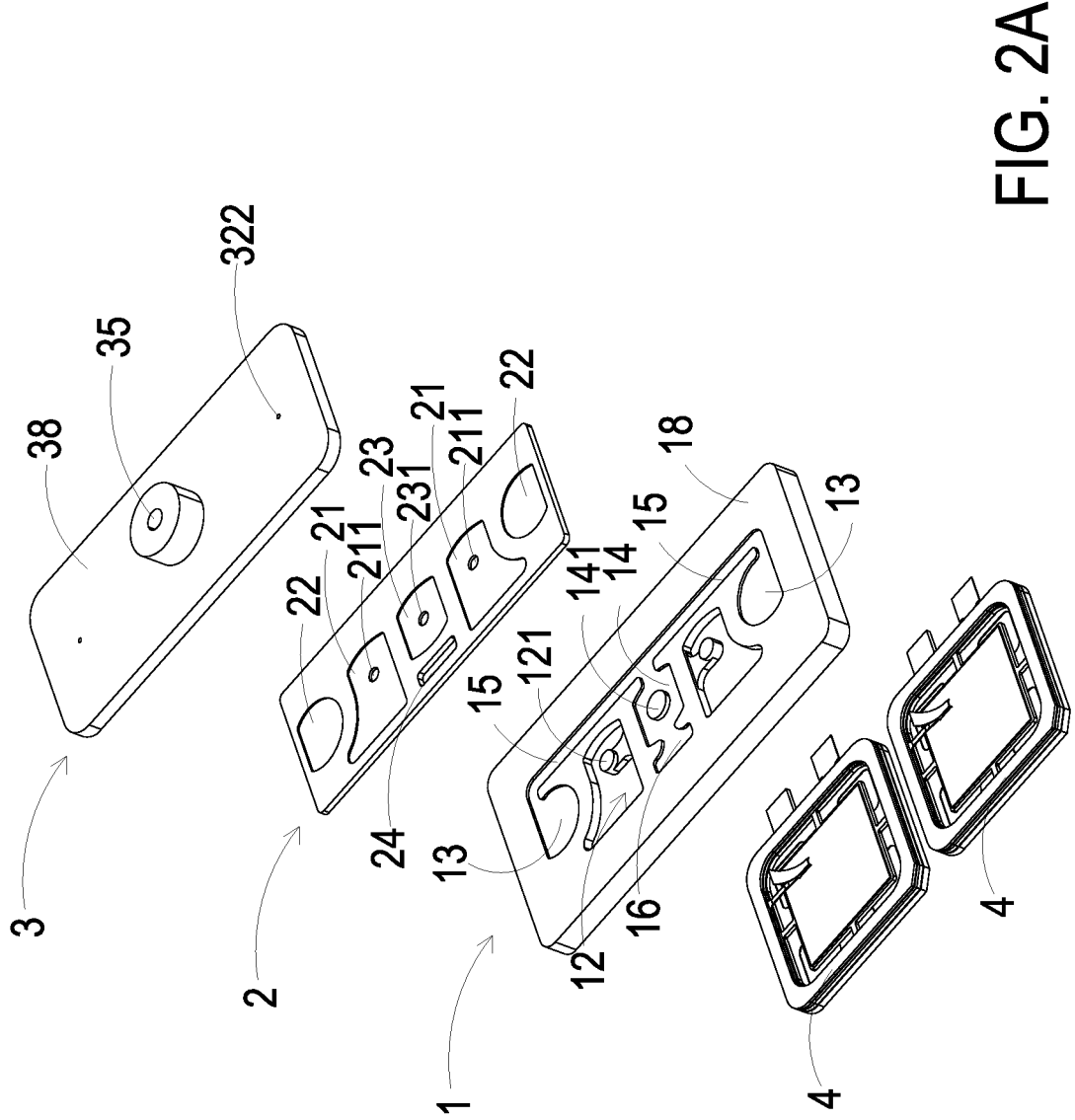
FIG. 2A is a schematic exploded view illustrating the miniature fluid transportation device according to the embodiment of the present disclosure.
Figure 2B:
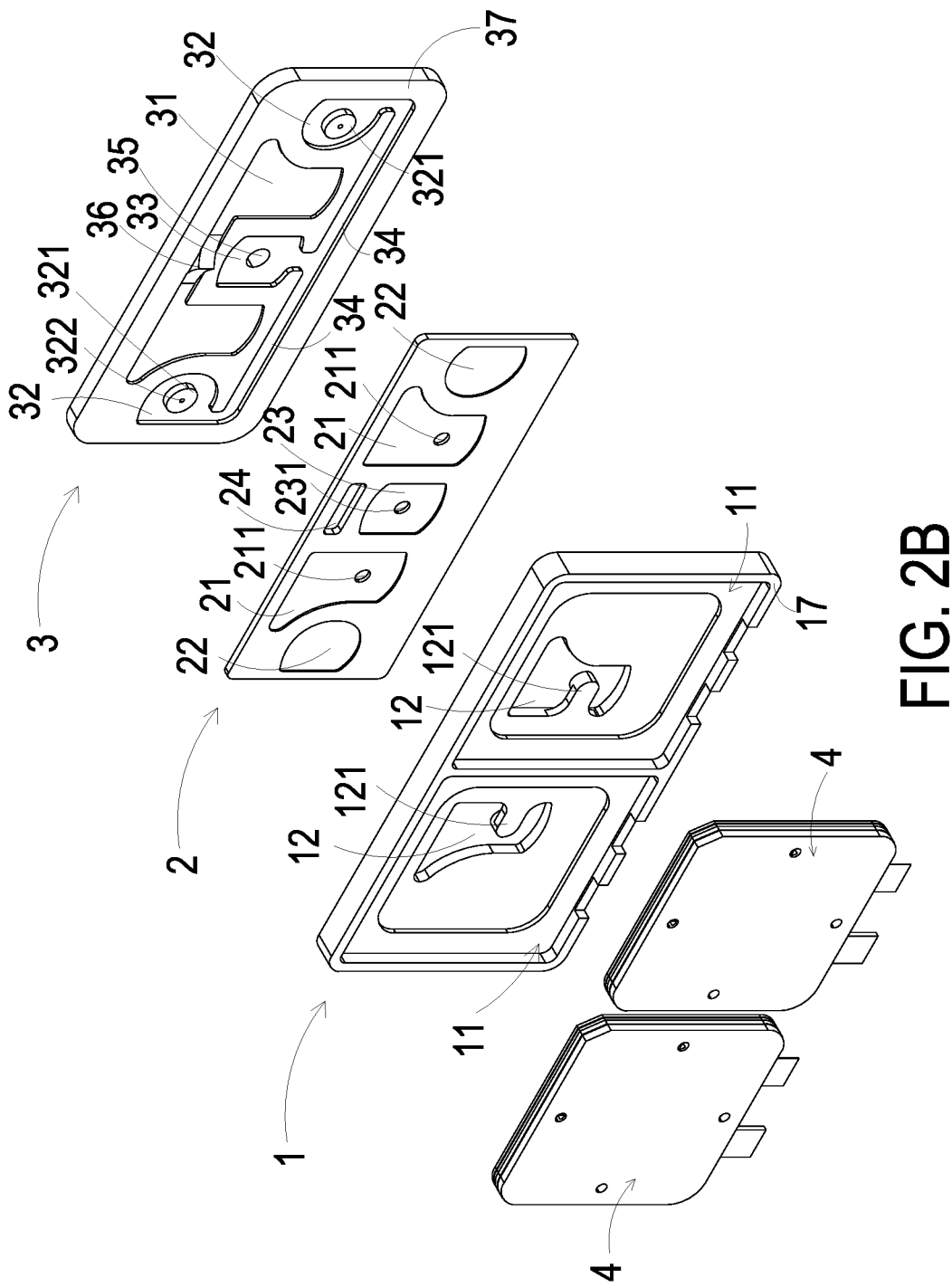
FIG. 2B is a schematic exploded view illustrating the miniature fluid transportation device according to the embodiment of the present disclosure from another viewpoint.

Please refer to FIG. 2A and FIG. 2B. The convergence component 1 includes a plurality of carrying regions 11, a plurality of convergence passages 12, a plurality of convergence slots 13, a convergence central slot 14, a communication slot 15 and a convergence side slot 16. The plurality of carrying regions 11 are corresponding in position to and in fluid communication with the plurality of convergence passages 12 one-to-one. A convex element 121 is disposed in the convergence passage 12. The plurality of convergence slots 13 are in fluid communication with the convergence central slot 14 through the communication slot 15. In addition, a convergence convex 141 is disposed at a center of the convergence central slot 14, and one side of the convergence central slot 14 is extended to and in fluid communication with the convergence side slot 16.

The valve component 2 is stacked on the convergence component 1 and includes a plurality of passage valve regions 21, a plurality of convergence-slot valve regions 22, a convergence-central-slot valve region 23 and a through side slot 24. The surfaces of the plurality of passage valve regions 21, the plurality of convergence-slot valve regions 22, and the convergence-central-slot valve region 23 are lower than the surface of the valve component 2. The plurality of passage valve regions 21 are corresponding in position to the plurality of convergence passages 12 one-toone. Each passage valve regions 21 is provided with a valve aperture 211, and the valve aperture 211 is corresponding in position to and abuts against the convex element 121 of the corresponding convergence passage 12. The plurality of convergence-slot valve regions 22 are corresponding in position to the plurality of convergence slots 13 one-to-one. The convergence-central-slot valve region 23 is corresponding in position to the convergence central slot 14 and is provided with an opening 231. The opening 231 is corresponding in position to and abuts against the convergence convex 141 of the convergence central slot 14. The through side slot 24 is corresponding in position to the convergence side slot 16.

The outlet plate 3 is assembled with the convergence component 1. The valve component 2 is positioned between the convergence component 1 and the outlet plate 3. The outlet plate 3 includes a plurality of guiding slots 31, a plurality of pressure-relief slots 32, a convergence outlet slot 33, a pressure-relief communication slot 34 and a collection channel 35. The plurality of guiding slots 31 are corresponding in position to the plurality of passage valve regions 21 one-to-one. A separation guiding block 36 is disposed between each of the plurality of guiding slots 31, and the separation guiding block 36 is corresponding in position to the through side slot 24 for separating the plurality of guiding slots 31 from each other, thereby preventing the plurality of guiding slots 31 from being in fluid communication with each other directly. The plurality of pressure-relief slots 32 are corresponding in position to the plurality of convergence-slot valve regions 22 one-to-one. The convergence outlet slot 33 is corresponding in position to the convergence-central-slot valve region 23. The plurality of pressure-relief slots 32 are in fluid communication with the convergence outlet slot 33 through the pressure-relief communication slot 34. Each compression slot 32 is provided with a pressure-relief convex 321, and a pressure-relief hole 322 is disposed at a center of the pressure-relief convex 321. The pressure-relief convex 321 abuts against the convergence-slot valve region 22 and seals the pressure-relief hole 322. In addition, the convergence outlet slot 33 is in fluid communication with the collection channel 35.

The plurality of fluid transportation actuation components 4 are disposed on the plurality of carrying regions 11 of the convergence component 1 respectively. The fluid transportation actuation component 4 seals the corresponding carrying region 11 and is configured to transport a fluid.

In addition, the convergence component 1 includes a first surface 17 and a second surface 18, and the first surface 17 and the second surface 18 are disposed opposite to each other. The plurality of carrying regions 11 are concavely formed on the first surface 17 of the convergence component 1. The plurality of convergence passages 12 run through the first surface 17 and the second surface 18 of the convergence component 1. The plurality of convergence slots 13, the convergence central slot 14, the communication slot 15 and the convergence side slot 16 are concavely formed on the second surface 18 of the convergence component 1. The outlet plate 3 includes a first surface 37 and a second surface 38, and the first surface 37 and the second surface 38 are disposed opposite to each other. The plurality of guiding slots 31, the plurality of pressure-relief slots 32, the convergence outlet slot 33 and the pressure-relief communication slot 34 are concavely formed on the first surface 37 of the outlet plate 3. The collection channel 35 and the pressure-relief hole 322 run through the first surface 37 and the second surface 38 of the outlet plate 3. Moreover, the collection channel 35 protrudes from the second surface 38 of the outlet plate 3.

Figure 3A:
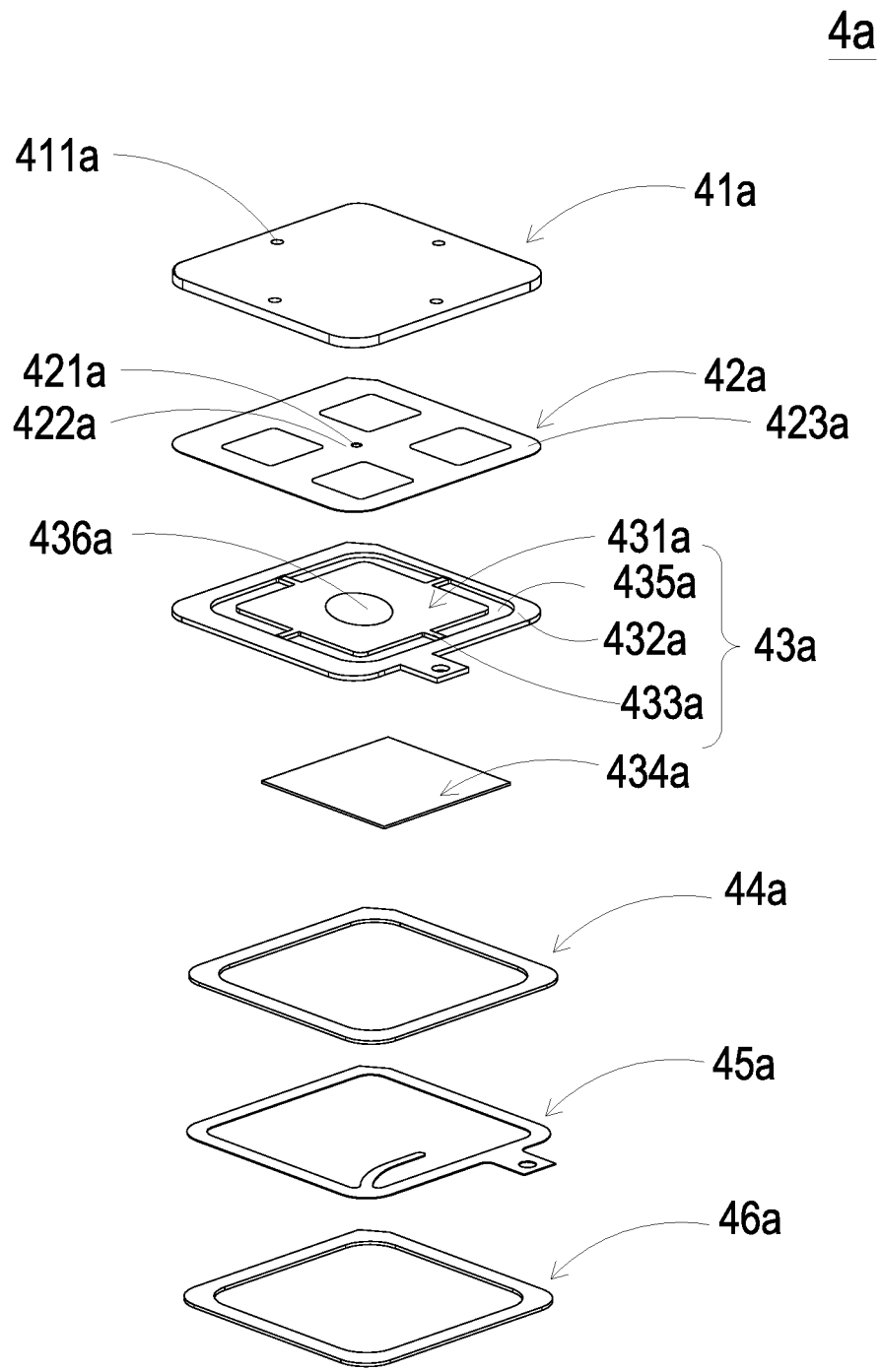
FIG. 3A is a schematic exploded rear view illustrating a micro pump of the miniature fluid transportation device according to the embodiment of the present disclosure.
Figure 3B:
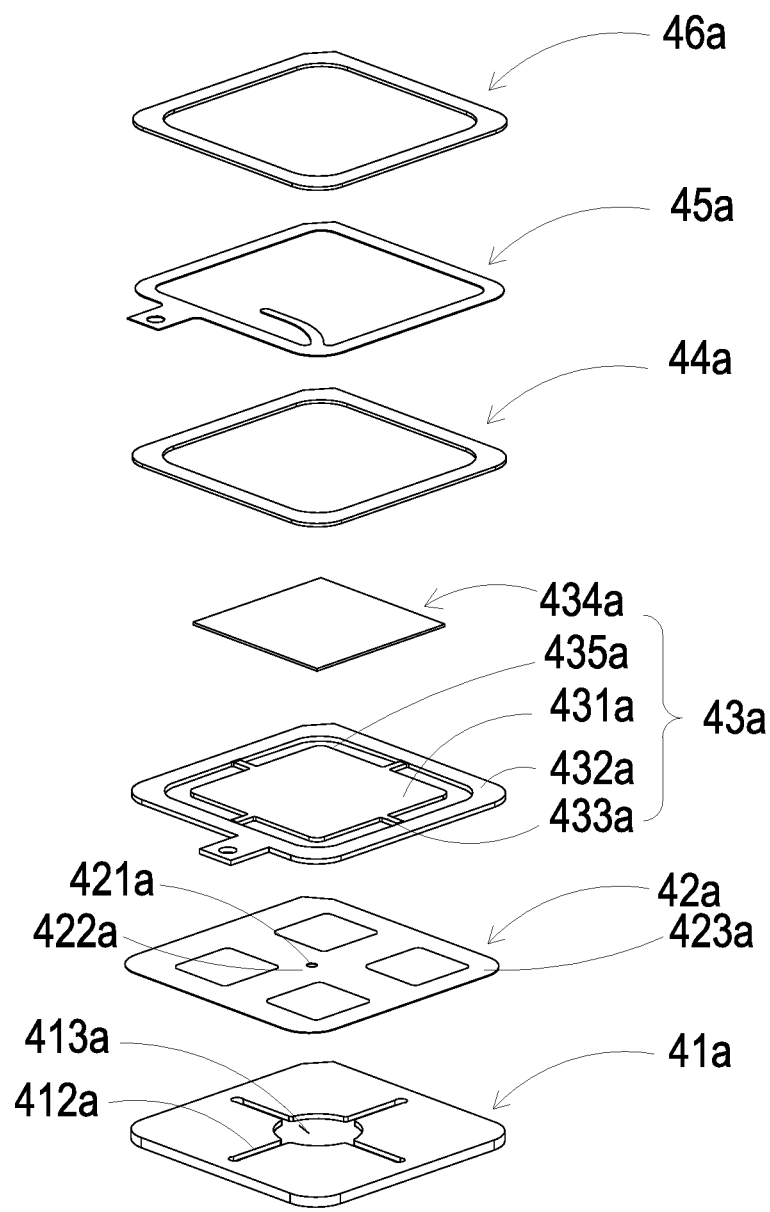
FIG. 3B is a schematic exploded front view illustrating the micro pump of the miniature fluid transportation device according to the embodiment of the present disclosure.

As shown in FIG. 3A and FIG. 3B. The fluid transportation actuation component 4 may be a micro pump 4a, and the micro pump 4a includes an inlet plate 41a, a resonance plate 42a, a piezoelectric actuator 43a, a first insulation plate 44a, a conducting plate 45a and a second insulation plate 46a.

The inlet plate 41a has at least one inlet aperture 411a, at least one convergence channel 412a and a convergence chamber 413a. The at least one inlet aperture 411a is disposed to inhale the fluid. The at least one inlet aperture 411a is corresponding to the at least one convergence channel 412a and is in fluid communication with the at least one convergence channel 412a. The at least one convergence channel 412a is converged to the convergence chamber 413a, so as to guide the fluid inhaled from the inlet aperture 411a to the convergence chamber 413a. In the embodiment, the numbers of the inlet apertures 411a and the convergence channels 412a are the same and are exemplified by four, but not limited thereto. The four inlet apertures 411a are in fluid communication with the four convergence channels 412a, respectively, and the four convergence channels 412a are converged to the convergence chamber 413a.

In the embodiment, the resonance plate 42a is attached to the inlet plate 41a. The resonance plate 42a has a central aperture 421a, a movable part 422a and a fixed part 423a. The central aperture 421a is disposed at a center of the resonance plate 42a, and is corresponding in position to the convergence chamber 413a of the inlet plate 41a. The movable part 422a surrounds the central aperture 421a and is corresponding in position to the convergence chamber 413a. The fixed part 423a surrounds the movable part 422a and is fixedly attached on the inlet plate 41a.

In the embodiment, the piezoelectric actuator 43a includes a suspension plate 431a, an outer frame 432a, at least one bracket 433a and a piezoelectric element 434a, at least one vacant space 435a and a bulge 436a. The suspension plate 431a is square-shaped suspension plate because the square suspension plate 431a is more power-saving than the circular suspension plate. Generally, the consumed power of the capacitive load under the resonance frequency is positively related to the resonance frequency. Since the resonance frequency of the square suspension plate 431a is obviously lower than that of the circular square suspension plate, the consumed power of the square suspension plate 431a is fewer. Therefore, the square suspension plate 431a in this embodiment is more effective in power-saving. In the embodiment, the outer frame 432a is disposed around the periphery of the suspension plate 431a. The at least one bracket 433a is connected between the suspension plate 431a and the outer frame 432a for elastically supporting the suspension plate 431a. The piezoelectric element 434a has a side, and a length of the side of the piezoelectric element 434a is less than or equal to that of the suspension plate 431a. The piezoelectric element 434a is attached on a surface of the suspension plate 431a. When a voltage is applied to the piezoelectric element 434a, the suspension plate 431a is driven to undergo the bending vibration. The at least one vacant space 435a is formed between the suspension plate 431a, the outer frame 432a and the at least one bracket 433a for allowing the fluid to flow through. The bulge 436a is formed on another surface of the suspension plate 431a opposite to the surface of the suspension plate 431a that the piezoelectric element 434a is attached thereon. In the embodiment, the bulge 436a may be integrally formed and protruded from the surface opposite to the one that the piezoelectric element 434a attached thereon by using an etching process, so as to form a stepped structure.

Figure 4A:
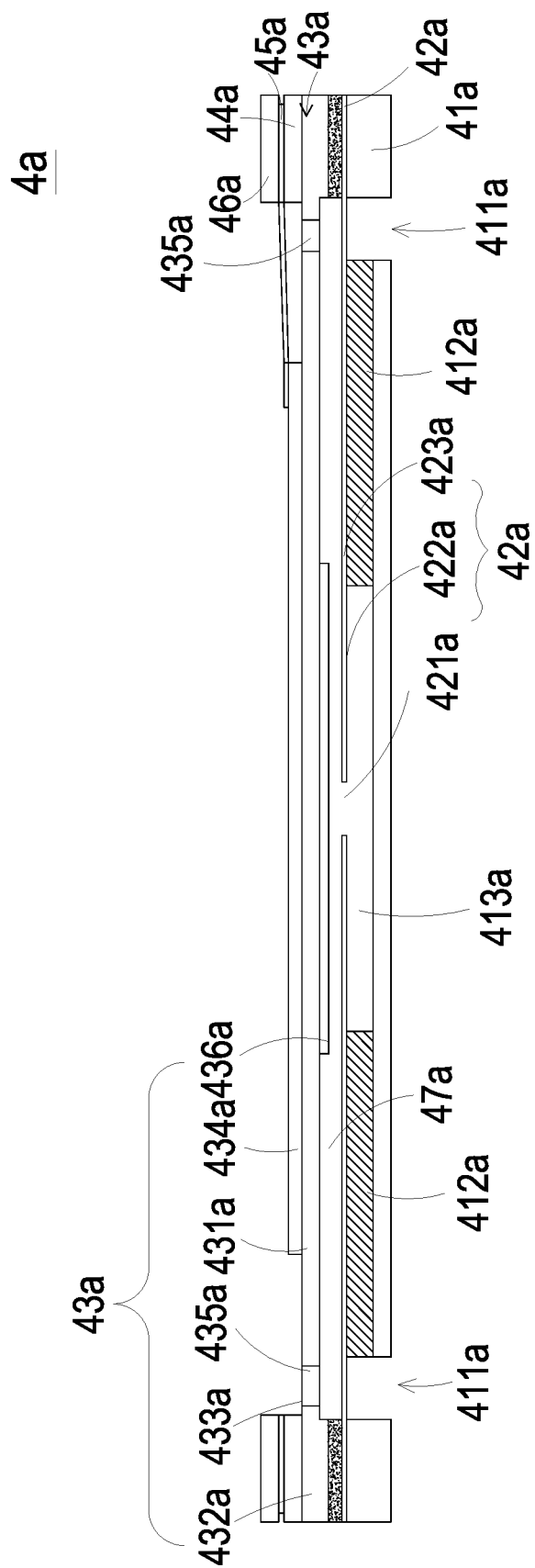
FIG. 4A is a cross sectional view illustrating the micro pump of the miniature fluid transportation device according to the embodiment of the present disclosure.

Please refer to FIG. 4A. In the embodiment, the inlet plate 41a, the resonance plate 42a, the piezoelectric actuator 43a, the first insulation plate 44a, the conducting plate 45a and the second insulation plate 46a are stacked and assembled sequentially. A chamber space 47a is formed between the suspension plate 431a and the resonance plate 42a, and the chamber space 47a can be formed by filling a gap between the resonance plate 42a and the outer frame 432a of the piezoelectric actuator 43a with a material, such as a conductive adhesive, but not limited thereto. Thus, a specific depth between the resonance plate 42a and the suspension plate 431a is maintained to allow the fluid to pass therethrough rapidly. In addition, since the suspension plate 431a and the resonance plate 42a are maintained with a suitable distance, the contact interference therebetween and the noise generated thereby is largely reduced. In some other embodiments, the thickness of the conductive adhesive filled into the gap between the resonance plate 42a and the outer frame 432a of the piezoelectric actuator 43a is reduced by increasing the height of the outer frame 432a of the piezoelectric actuator 43a, so as to form the chamber space 47a. Therefore, the entire assembling structure of the micro pump 4a would not be indirectly influenced by the impact on the filling material resulting from the hot pressing temperature and the cooling temperature, so as to prevent the actual size of the chamber space 47a from being influenced by the thermal expansion and cooling contraction of the filling material, i.e., conductive adhesive, but not limited thereto. In addition, since the transportation effect of the micro pump 4a is affected by the chamber space 47a, maintaining a constant chamber space 47a is very important to provide a stable transportation efficiency of the micro pump 4a.

Figure 4B:
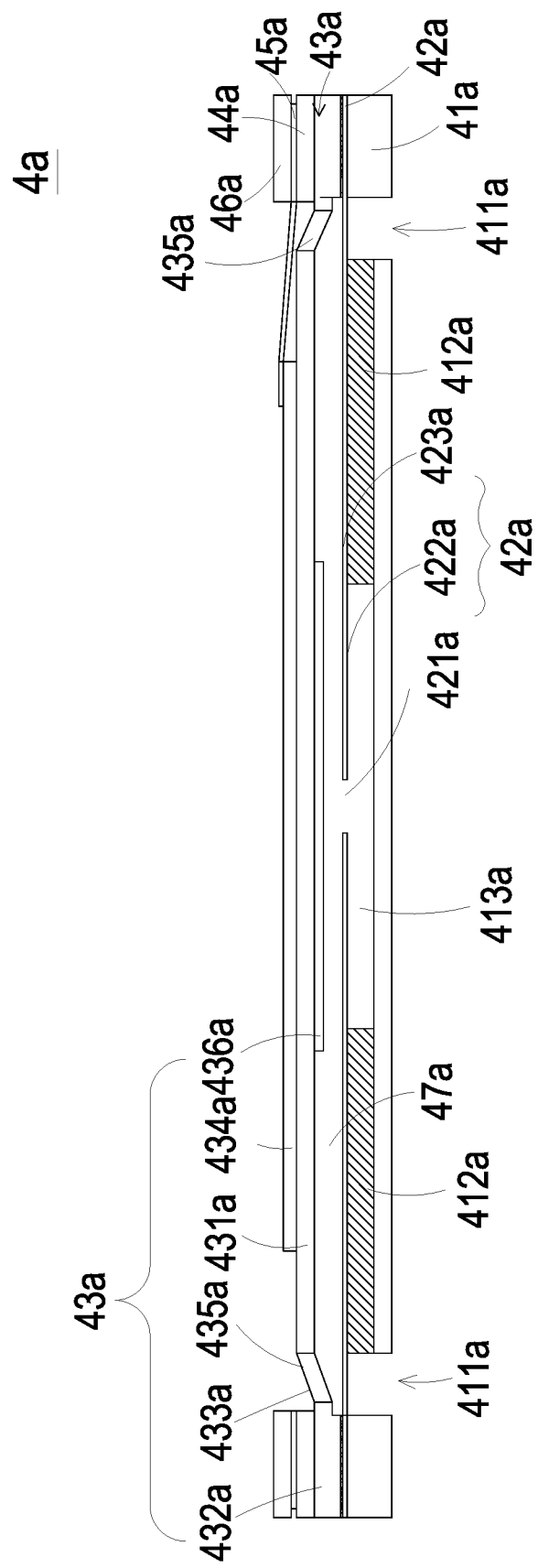
FIG. 4B is a cross sectional view illustrating a micro pump of the miniature fluid transportation device according to another embodiment of the present disclosure.

Please refer to FIG. 4B. In some other embodiments, the suspension plate 431a is formed by stamping to make it extend outwardly a distance. The extended distance can be adjusted through the at least one bracket 433a formed between the suspension plate 431a and the outer frame 432a. Consequently, the surface of the bulge 436a disposed on the suspension plate 431a and the surface of the outer frame 432a are non-coplanar. Namely, the surface of the bulge 436a is away from the surface of the outer frame 432a, and the surfaces of the bulge 436a and the outer frame 432a are not located on the same plane. Through applying a small amount of filling materials, such as a conductive adhesive, to the coupling surface of the outer frame 432a, the piezoelectric actuator 43a is attached to the fixed part 423a of the resonance plate 42a by hot pressing, thereby assembling the piezoelectric actuator 43a and the resonance plate 42a in combination. Thus, the structure of the chamber space 47a is improved by directly stamping the suspension plate 431a of the piezoelectric actuator 43a described above. In this way, the required chamber space 47a can be obtained by adjusting the stamping distance of the suspension plate 431a of the piezoelectric actuator 43a, thereby simplifying structural design of the chamber space 47a, and also achieves the advantages of simplifying the manufacturing process and shortening the processing time. In addition, the first insulation plate 44a, the conducting plate 45a and the second insulation plate 46a are all thin frame-shaped sheets, but are not limited thereto, and are sequentially stacked on the piezoelectric actuator 43a to complete the entire structure of micro pump 4a.

Figure 5A:
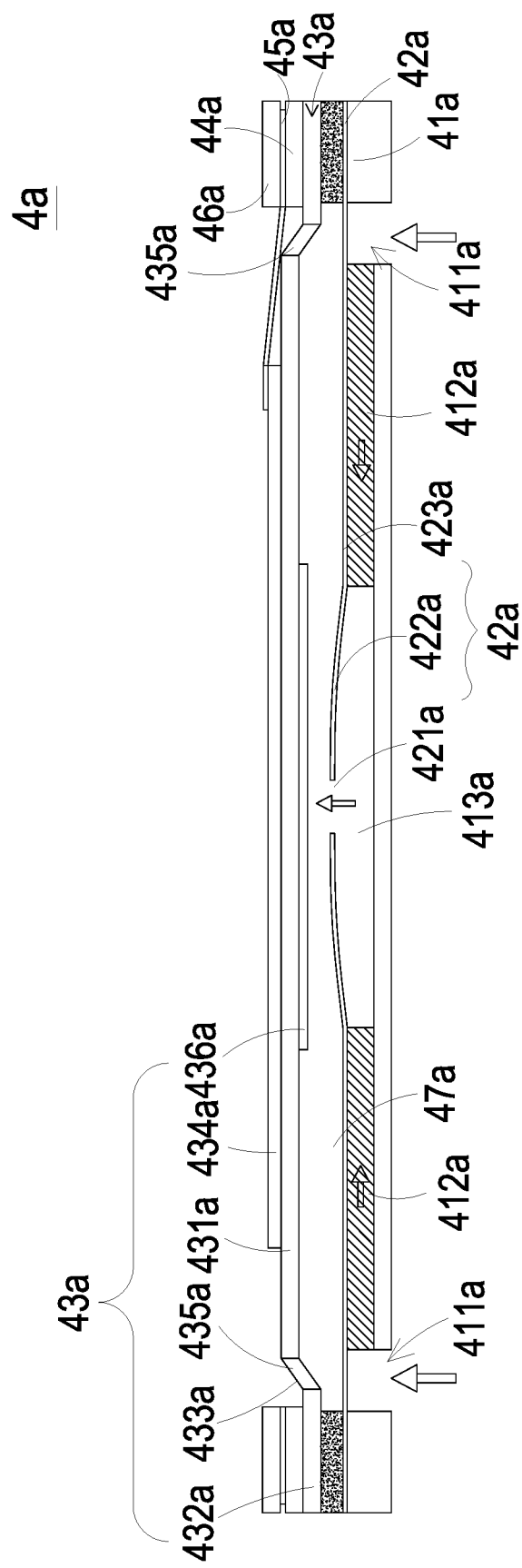
FIGS. 5A to 5C schematically illustrate the operation steps of the micro pump of the miniature fluid transportation device of FIG. 4A.
Figure 5B:
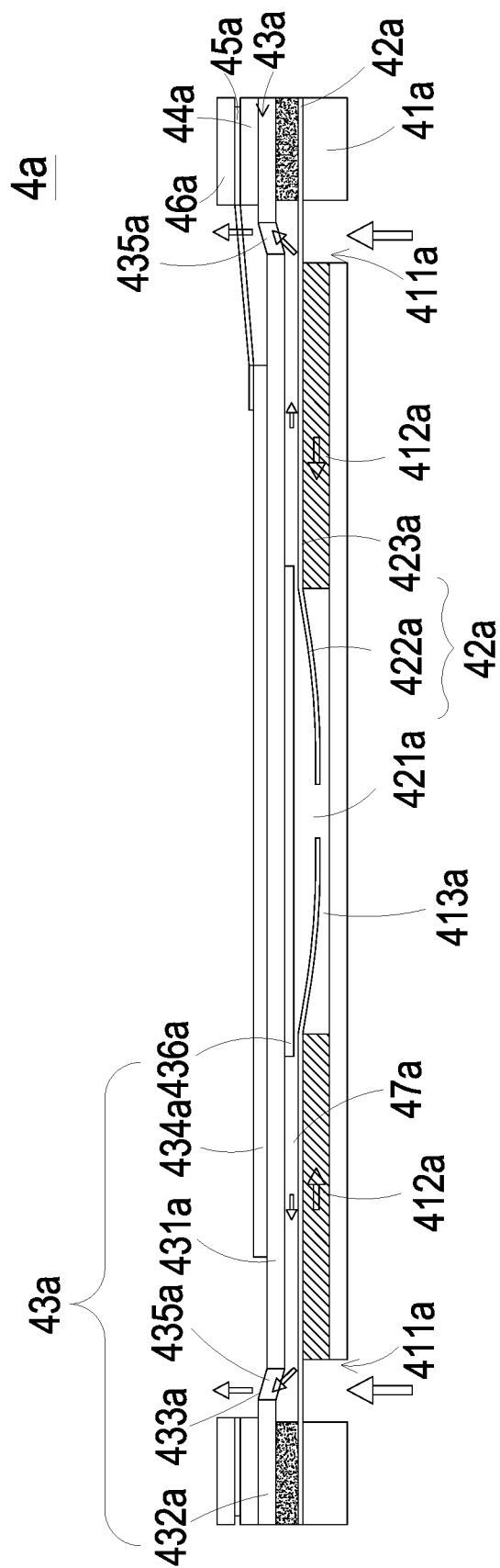
Figure 5C:
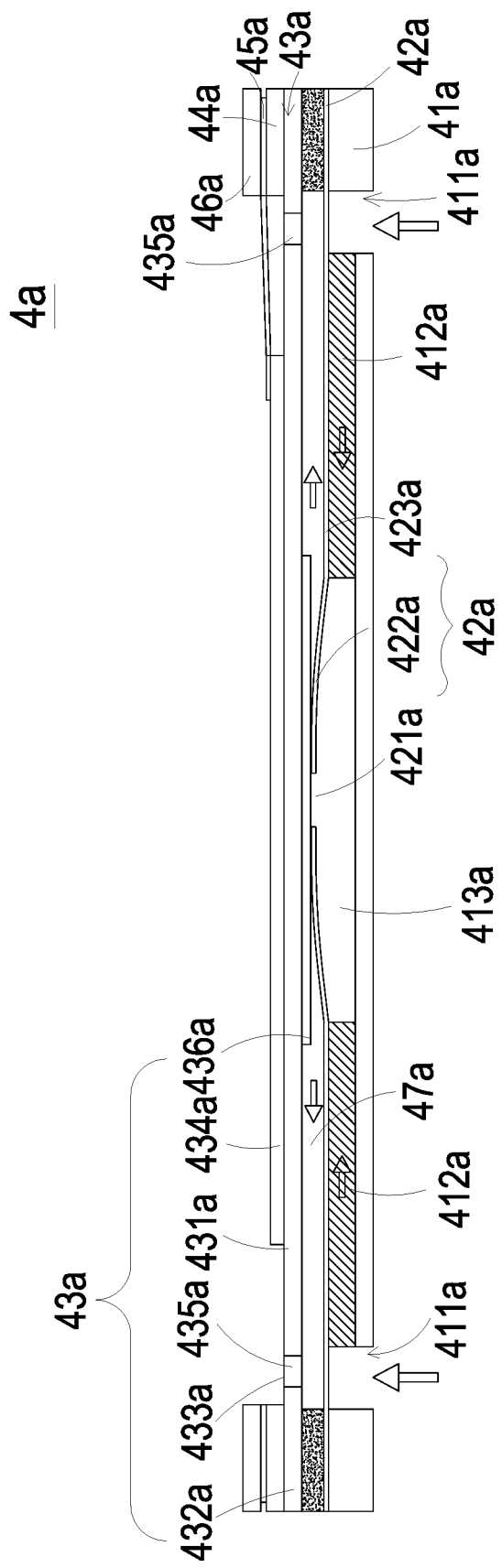

In order to understand the operation steps of the micro pump 4a, please refer to FIGS. 5A to 5C. Please refer to FIG. 5A, when the piezoelectric element 434a of the piezoelectric actuator 43a is deformed after a voltage is applied thereto, the suspension plate 431a is driven to displace in a direction away from the resonance plate 42a. In that, the volume of the chamber space 47a is increased, a negative pressure is generated in the chamber space 47a, and the fluid in the convergence chamber 413a is introduced into the chamber space 47a. At the same time, the resonance plate 42a is displaced synchronously under resonance effect. Thereby, the volume of the convergence chamber 413a is increased. Since the fluid in the convergence chamber 413a is introduced into the chamber space 47a, the convergence chamber 413a is also in a negative pressure state, and the fluid is sucked into the convergence chamber 413a through the inlet aperture 411a and the convergence channel 412a. Then, as shown in FIG. 5B, the piezoelectric element 434a drives the suspension plate 431a to displace toward the resonance plate 42a to compress the chamber space 47a. Similarly, the resonance plate 42a is displaced in resonance with the suspension plate 431a, so as to force the fluid in the chamber space 47a to transmit and pass through the vacant spaces 435a synchronously and achieve the effect of fluid transportation. Finally, as shown in FIG. 5C, when the suspension plate 431a is driven to return to an initial state that the suspension plate 431a not driven by the piezoelectric element 434a yet, the resonance plate 42a is also driven to displace in a direction away from the inlet plate 41a. In that, the resonance plate 42a pushes the fluid in the chamber space 47a toward the vacant spaces 435a, and the volume of the convergence chamber 413a is increased. Thus, the fluid can continuously pass through the inlet aperture 411a and the convergence channel 412a, and can be converged in the convergence chamber 413a. Through repeating the operation steps illustrated in FIGS. 5A to 5C continuously, the micro pump 4a can continuously transport the fluid at high speed. The fluid enters the inlet apertures 411a, flows through a flow path formed by the inlet plate 41a and the resonance plate 42a and generates a pressure gradient, and then is transported upwardly through the vacant spaces 435a. Thus, the fluid flows at a high speed, and completes the fluid transporting operation of the micro pump 4a.

Figure 6A:
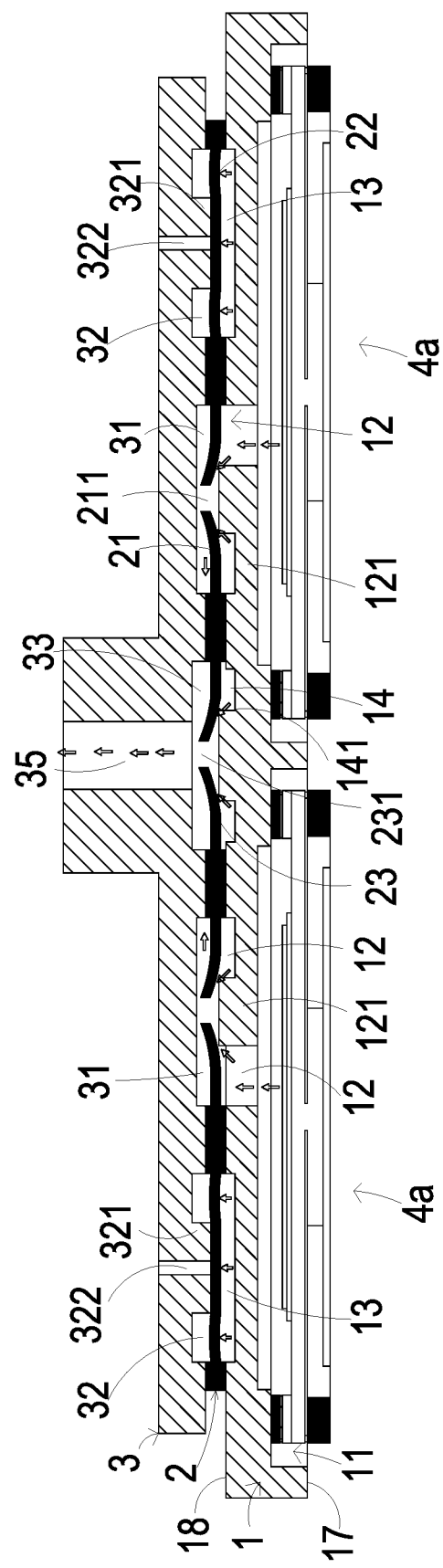
FIG. 6A is a schematic cross sectional view illustrating the operation steps of collecting and outputting fluid at the cross section A-A' of the miniature fluid transportation device of FIG. 1A.
Figure 6B:
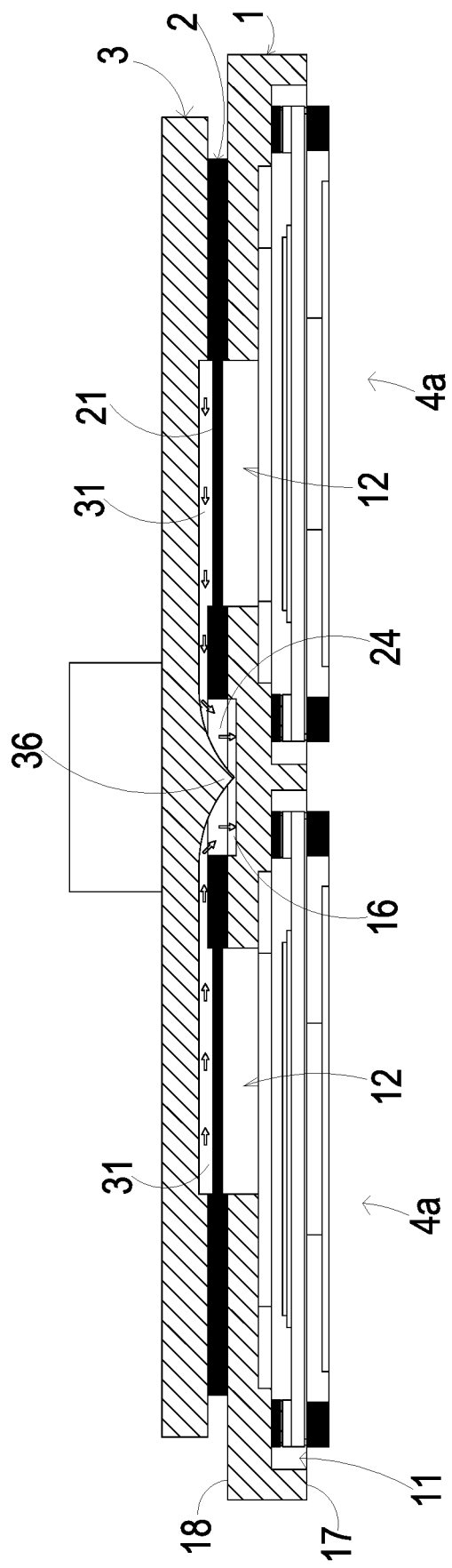
FIG. 6B is a schematic cross sectional view illustrating the operation steps of collecting and outputting fluid at the cross section B-B' of the miniature fluid transportation device of FIG. 1A.
Figure 6C:
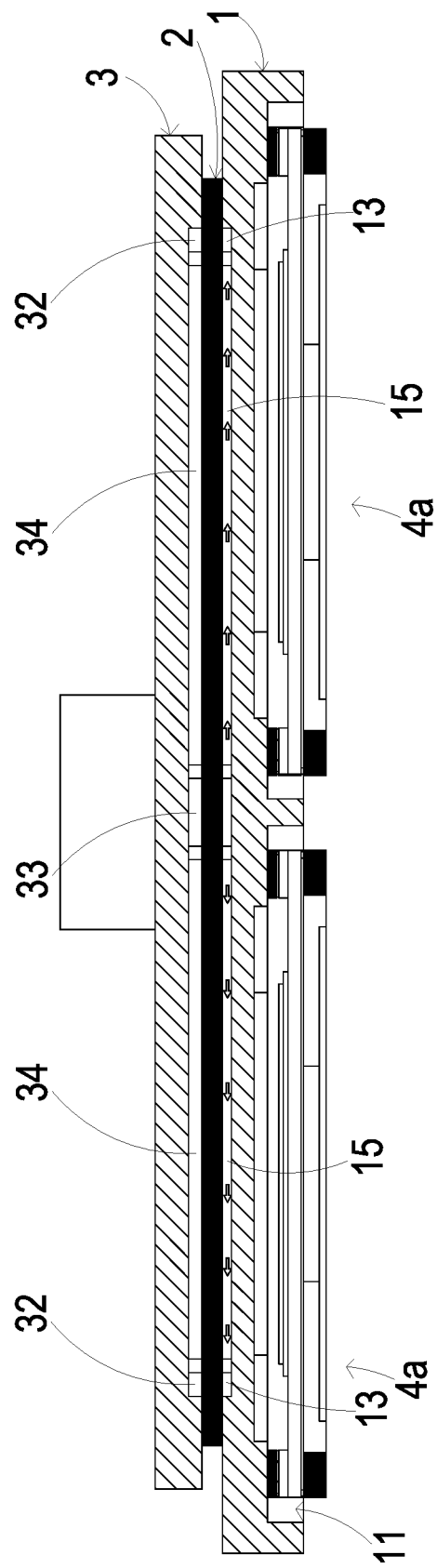
FIG. 6C is a schematic cross sectional view illustrating the operation steps of collecting and outputting fluid at the cross section C-C' of the miniature fluid transportation device of FIG. 1A.

Please refer to FIGS. 6A to 6C. The actuations of the micro pump 4a can transport the fluid to the convergence component 1. Further, the micro pump 4a guides the fluid into every convergence passage 12 of the convergence component 1 so as to push every passage valve region 21 of the valve component 2. Accordingly, the valve aperture 211 of the passage valve region 21 is separated from the convex element 121 of the convergence passage 12 and opened. Therefore, the fluid flows into the plurality of guiding slots 31 of the outlet plate 3, and then flows into the through side slot 24 under the guiding of the separation guiding block 36. Afterwards, the fluid is converged in the convergence central slot 14 of the convergence component 1 through the convergence side slot 16 and pushing the opening 231 of the convergence-central-slot valve region 23 to separate from the convergence convex 141 of the convergence central slot 14 and opens the opening 231. The converged fluid is guided into the convergence outlet slot 33, and then discharged out through the collection channel 35. Meanwhile, the fluid in the convergence central slot 14 also flows into the plurality of convergence slots 13 through the communication slot 15, and pushes the corresponding convergence-slot valve regions 22 to abut against the pressure-relief convex 321 of the outlet plate 3 for sealing the pressure-relief holes 322. Consequently, the fluid is prevented from flowing out through the pressure-relief holes 322, and the fluid is collecting and discharging out through the collection channel 35.

Figure 7A:
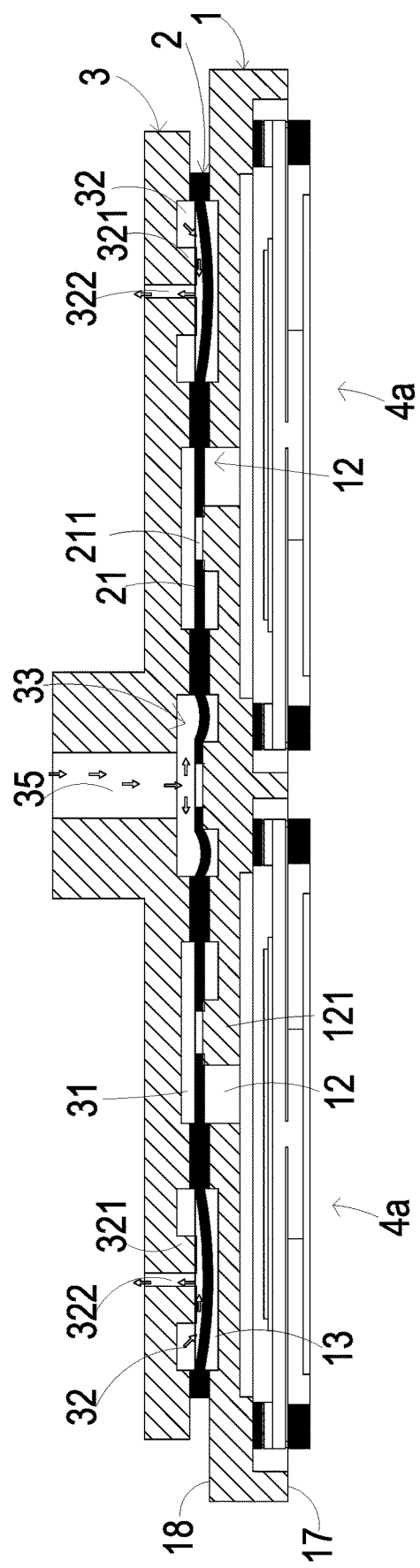
FIG. 7A is a schematic cross sectional view illustrating the operation steps of decompressing fluid at the cross section A-A' of the miniature fluid transportation device of FIG. 1A.
Figure 7B:
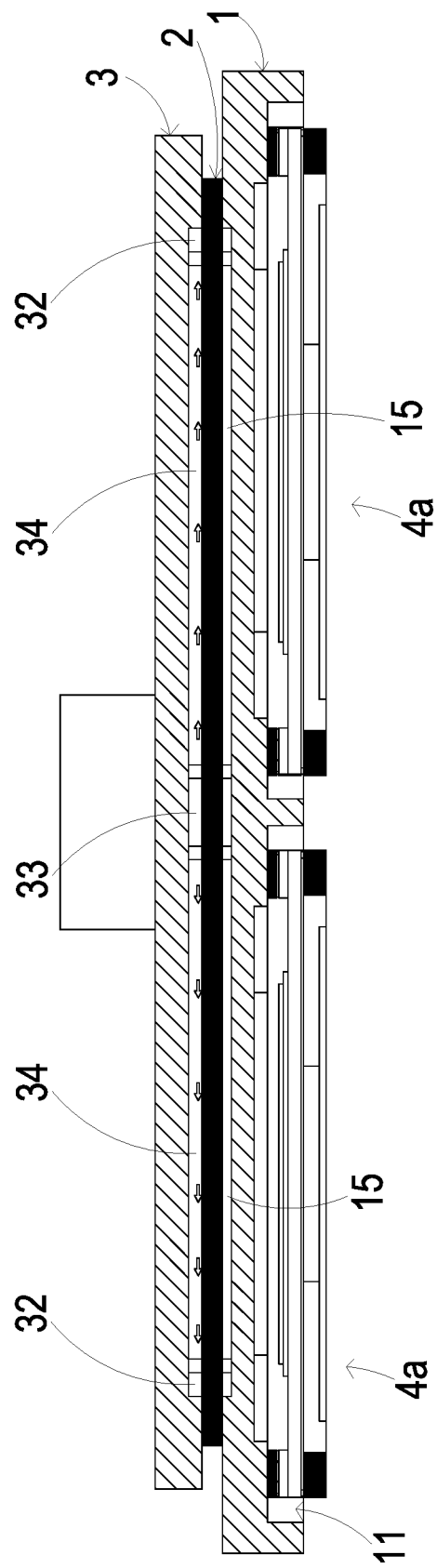
FIG. 7B is a schematic cross sectional view illustrating the operation steps of decompressing fluid at the cross section C-C' of the miniature fluid transportation device of FIG. 1A.

Please refer to FIG. 7A and FIG. 7B. When the fluid transportation actuation components 4 (the micro pumps 4a) stop operating, the fluid converged in the collection channel 35 pushes the opening 231 of the convergence-central-slot valve region 23 to abut against the convergence convex 141 of the convergence central slot 14, and closes the opening 231. The fluid is guided into the pressure-relief slots 32 through the pressure-relief communication slot 34 and pushes each convergence-slot valve region 22 to be separated from the corresponding pressure-relief convex 321. Accordingly, the pressure-relief holes 322 are opened, and the fluid can be discharged out through the pressure-relief holes 322 for completing the pressure-relief operation.

Figure 8A:
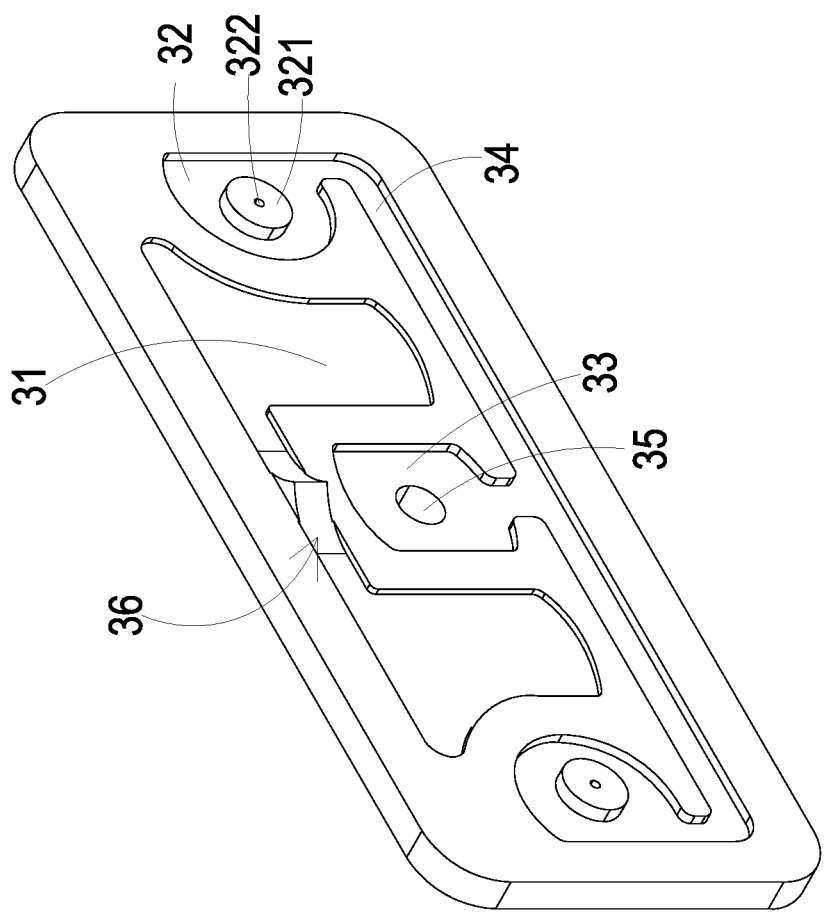
FIG. 8A is a schematic view illustrating a separation guiding block of an output plate according to an embodiment of the present disclosure.
Figure 8B:
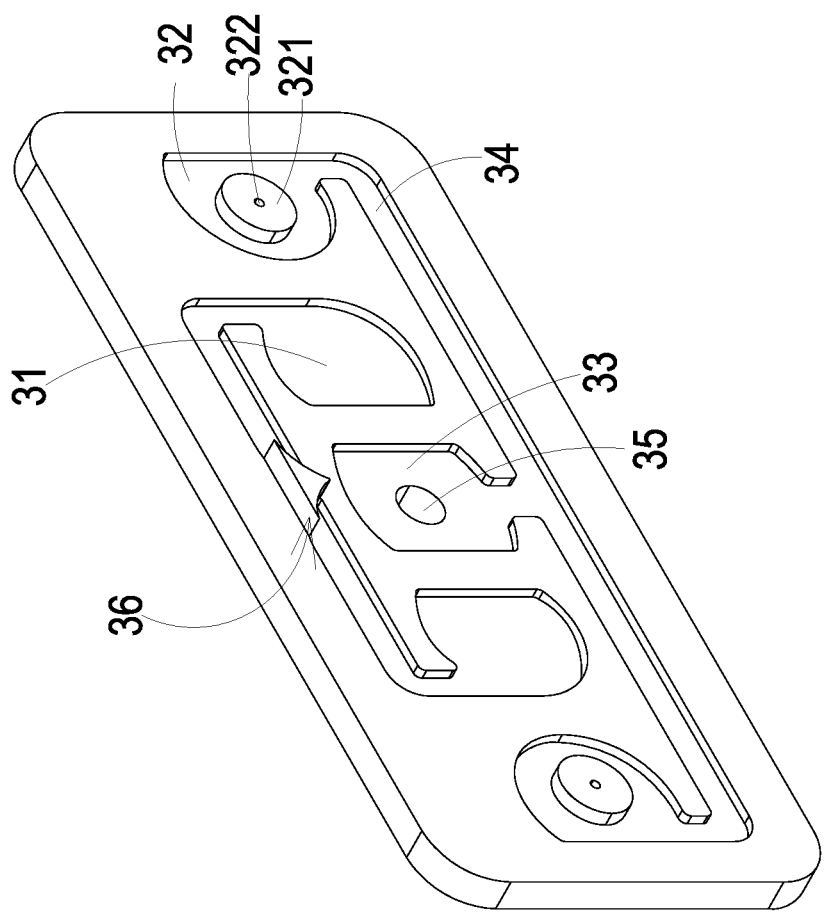
FIG. 8B is a schematic view illustrating a separation guiding block of an output plate according to another embodiment of the present disclosure.

Please refer to FIG. 8A, in an embodiment, the separation guiding block 36 is a horizontal triangular-prism guiding element. Please refer to FIG. 8B, in an embodiment, the separation guiding block 36 is a vertical triangular-prism guiding element.

Figure 9A:
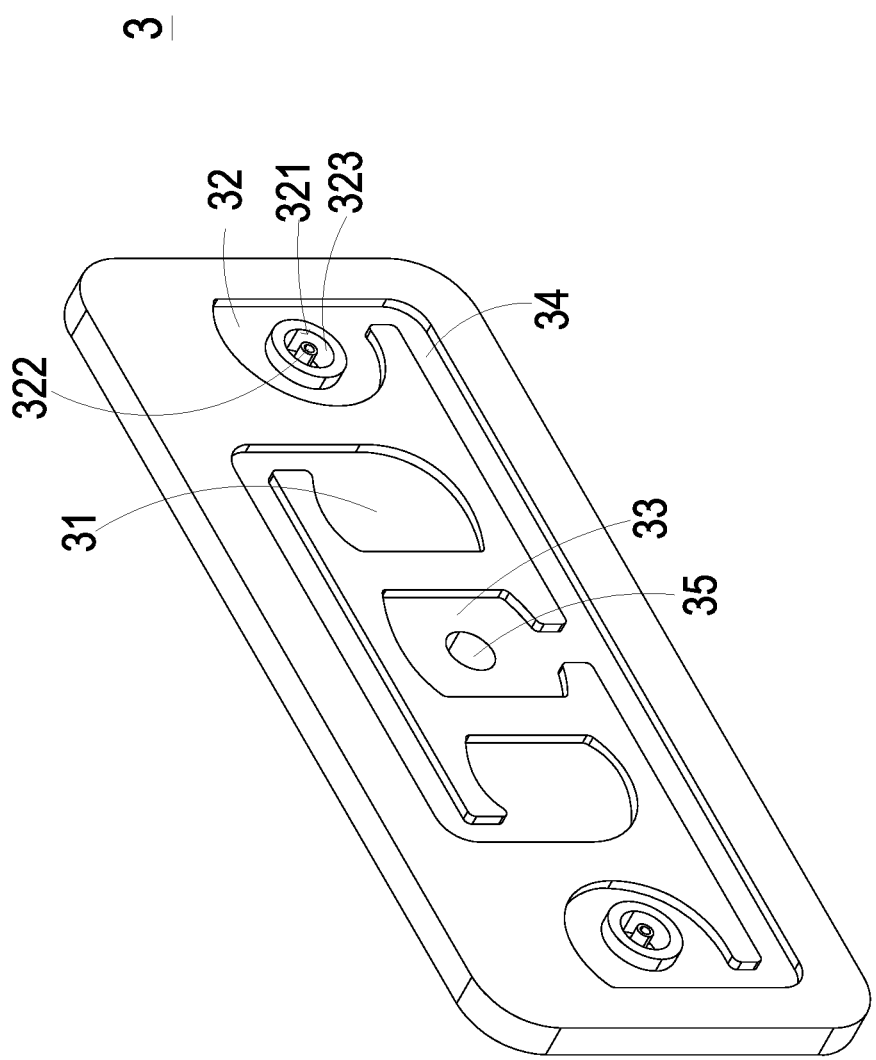
FIG. 9A is a schematic view illustrating a wave dissipation structure of an output plate according to an embodiment of the present disclosure.
Figure 9B:
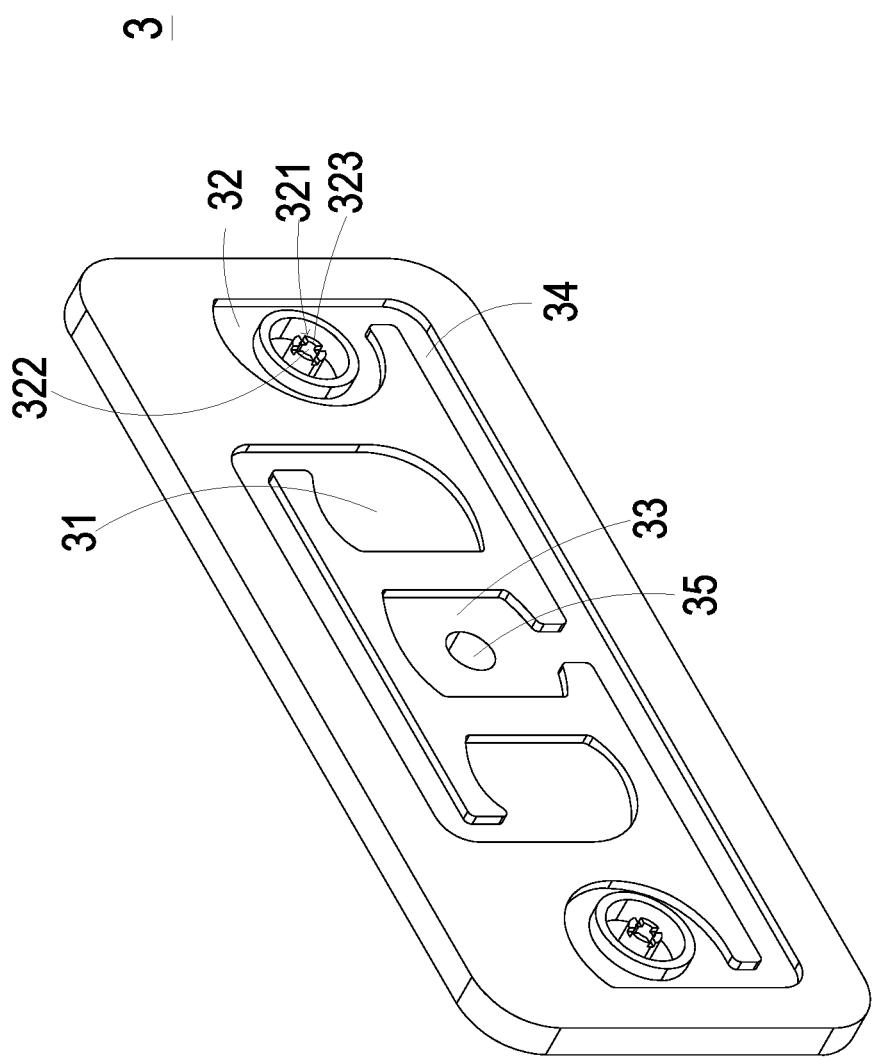
FIG. 9B is a schematic view illustrating a wave dissipation structure of an output plate according to another embodiment of the present disclosure.
Figure 9C:
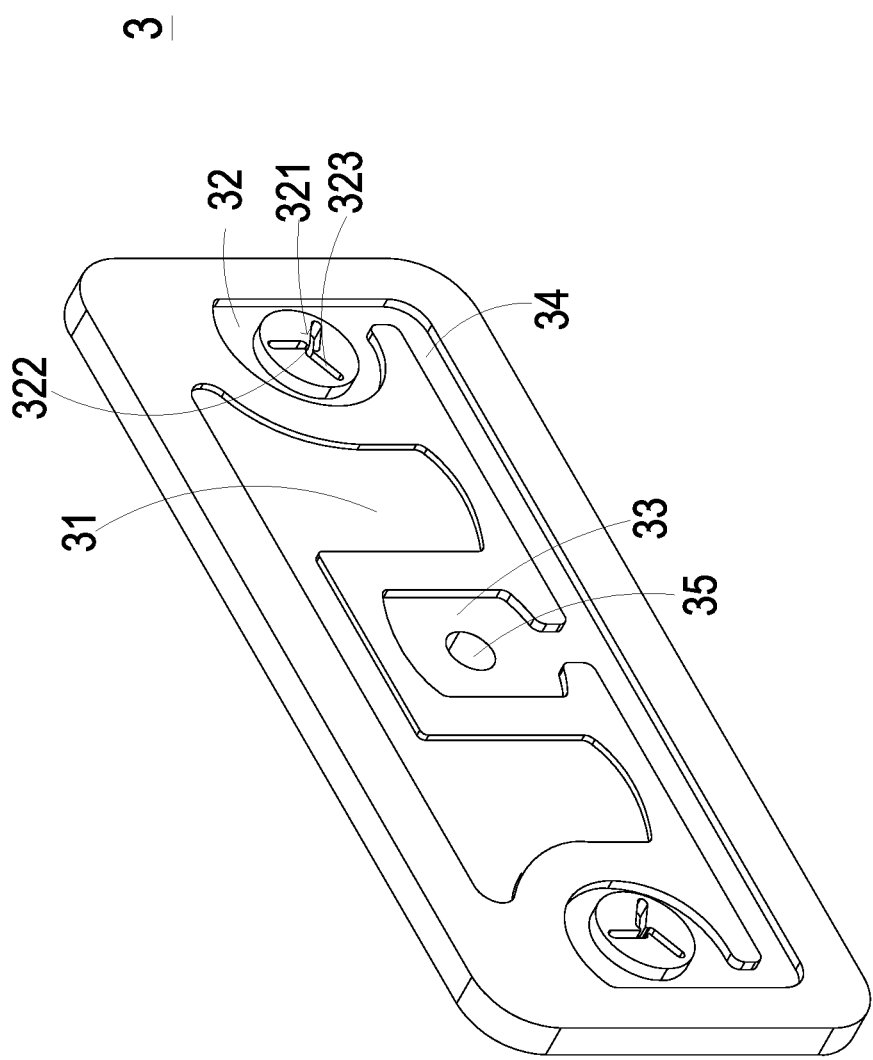
FIG. 9C is a schematic view illustrating a wave dissipation structure of an output plate according to another embodiment of the present disclosure.

A wave dissipation structure 323 is formed at the periphery of the pressure-relief convex 321. Please refer to FIG. 9A, the wave dissipation structure 323 is a circular-ring wave dissipation structure. Alternatively, as shown in FIG. 9B, the wave dissipation structure 323 is a wave dissipation structure with breach. Alternatively, as shown in FIG. 9C, the wave dissipation structure 323 is a rotary-guiding wave dissipation structure.

Figure 10A:
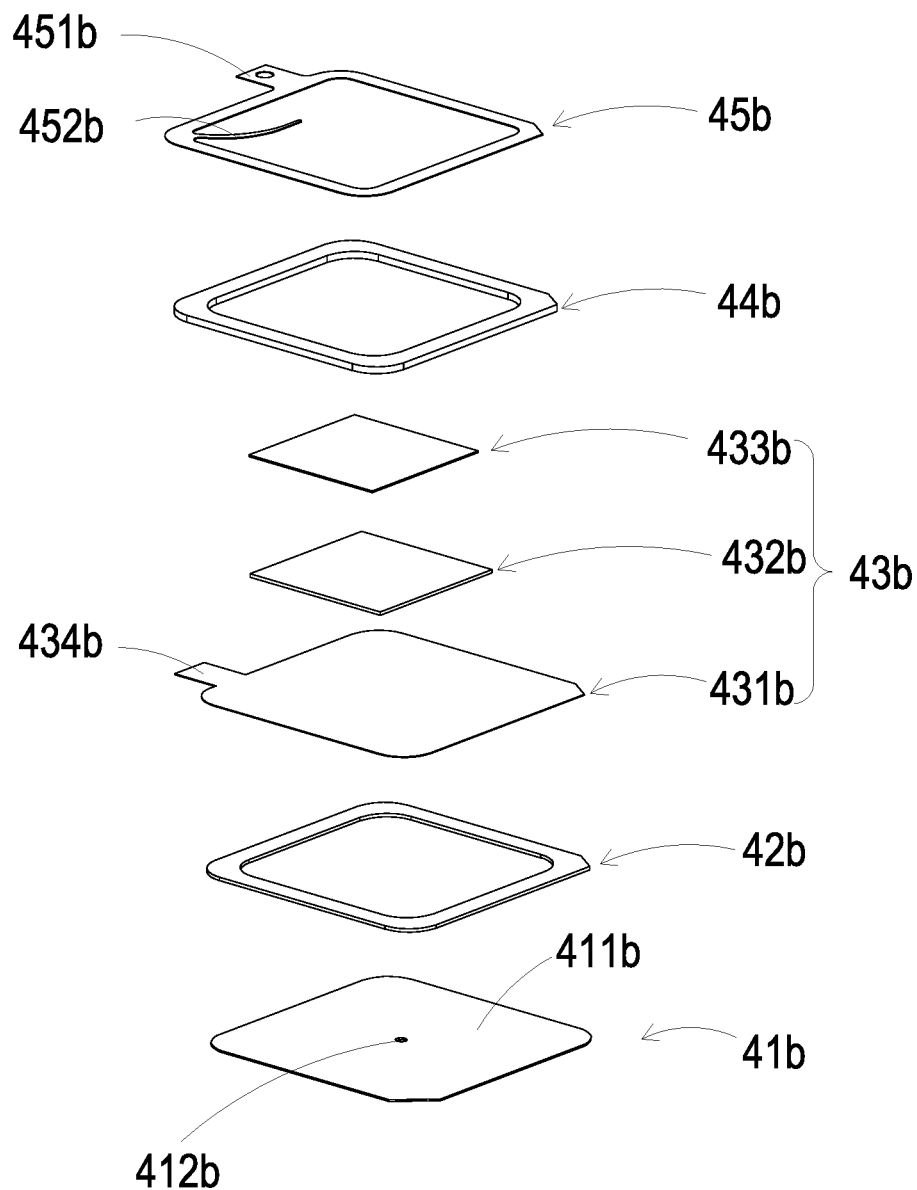
FIG. 10A is a schematic exploded rear view illustrating a blower-type pump of the miniature fluid transportation device of the present disclosure.
Figure 10B:
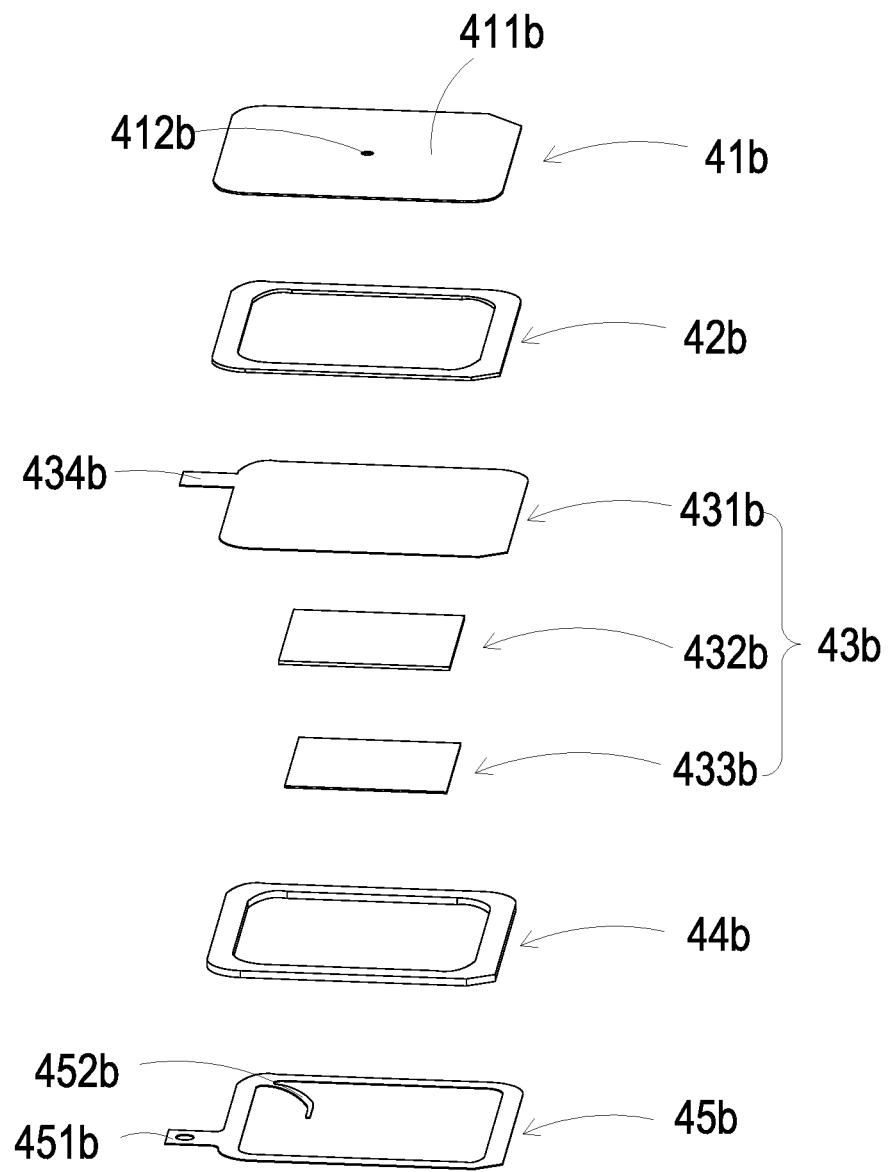
FIG. 10B is a schematic exploded front view illustrating the blower-type pump of the miniature fluid transportation device of the present disclosure.

Please refer to FIG. 10A and FIG. 10B. The fluid transportation actuation component 4 may be a blower-type micro pump 4b includes a gas-injection plate 41b, a chamber frame 42b, an actuator element 43b, an insulation frame 44b and a conducting frame 45b.

The gas-injection plate 41b is made by a flexible material and includes a suspension plate 411b and a hollow aperture 412b. For example but not exclusively, the suspension plate 411b is a sheet structure permitted to undergo a bending deformation, and the shape and size of the suspension plate 411b are corresponding to that of the inner edge of the carrying region 11. Preferably but not exclusively, the shape of the suspension plate 411b is selected from the group consisting of a square, a circle, an ellipse, a triangle and a polygon. The hollow aperture 412b passes through a center of the suspension plate 411b, so as to allow the fluid to flow therethrough.

In the embodiment, the chamber frame 42b is carried and stacked on the suspension plate 411b of the gas-injection plate 411b. In addition, the shape of the chamber frame 42b is corresponding to that of the gas-injection plate 41b. The actuator element 43b is carried and stacked on the chamber frame 42b. A resonance chamber 46b is collaboratively defined by the actuator element 43b, the chamber frame 42b and the suspension plate 411b. The insulation frame 44b is carried and stacked on the actuator element 43b and the appearance of the insulation frame 44b is similar to that of the gas-injection plate 41b. The conducting frame 45b is carried and stacked on the insulation frame 44b, and the appearance of the conducting frame 45b is similar to that of the insulation frame 44b. The conducting frame 45b further includes a conducting pin 451b and a conducting electrode 452b. The conducting pin 451b is extended outwardly from the outer edge of the conducting frame 45b, and the conducting electrode 452b is extended inwardly from the inner edge of the conducting frame 45b.

In addition, the actuator element 43b further includes a piezoelectric carrying plate 431b, an adjusting resonance plate 432b and a piezoelectric plate 433b. The piezoelectric carrying plate 431b is carried and stacked on the chamber frame 42b. The adjusting resonance plate 432b is carried and stacked on the piezoelectric carrying plate 431b. The piezoelectric plate 433b is carried and stacked on the adjusting resonance plate 432b. The adjusting resonance plate 432b and the piezoelectric plate 433b are accommodated in the insulation frame 44b. The conducting electrode 452b of the conducting frame 45b is electrically connected to the piezoelectric plate 433b. In the embodiment, the piezoelectric carrying plate 431b and the adjusting resonance plate 432b are made by a conductive material. The piezoelectric carrying plate 431b includes a piezoelectric pin 434b, and the piezoelectric pin 434b and the conducting pin 451b receive a driving signal, such as a driving frequency and a driving voltage. In that, an electric circuit for the driving signal is formed by the piezoelectric pin 434b, the piezoelectric carrying plate 431b, the adjusting resonance plate 432b, the piezoelectric plate 433b, the conducting electrode 452b, the conducting frame 45b and the conducting pin 451b. Moreover, the insulation frame 44b is insulated between the conducting frame 45b and the actuator element 43b, so as to avoid the occurrence of a short circuit. Thereby, the driving signal is transmitted to the piezoelectric plate 433b. After receiving the driving signal, such as the driving frequency and the driving voltage, the piezoelectric plate 433b deforms due to the piezoelectric effect, and the piezoelectric carrying plate 431b and the adjusting resonance plate 432b are further driven to generate the bending deformation in the reciprocating manner.

As described above, the adjusting resonance plate 432b is located between the piezoelectric plate 433b and the piezoelectric carrying plate 431b and served as a cushion between the piezoelectric plate 433b and the piezoelectric carrying plate 431b. Thereby, the vibration frequency of the piezoelectric carrying plate 431b is adjustable. Basically, the thickness of the adjusting resonance plate 432b is greater than the thickness of the piezoelectric carrying plate 431b, and the thickness of the adjusting resonance plate 432b is adjustable, thereby the vibration frequency of the actuator element 43b can be adjusted accordingly.

Figure 11A:
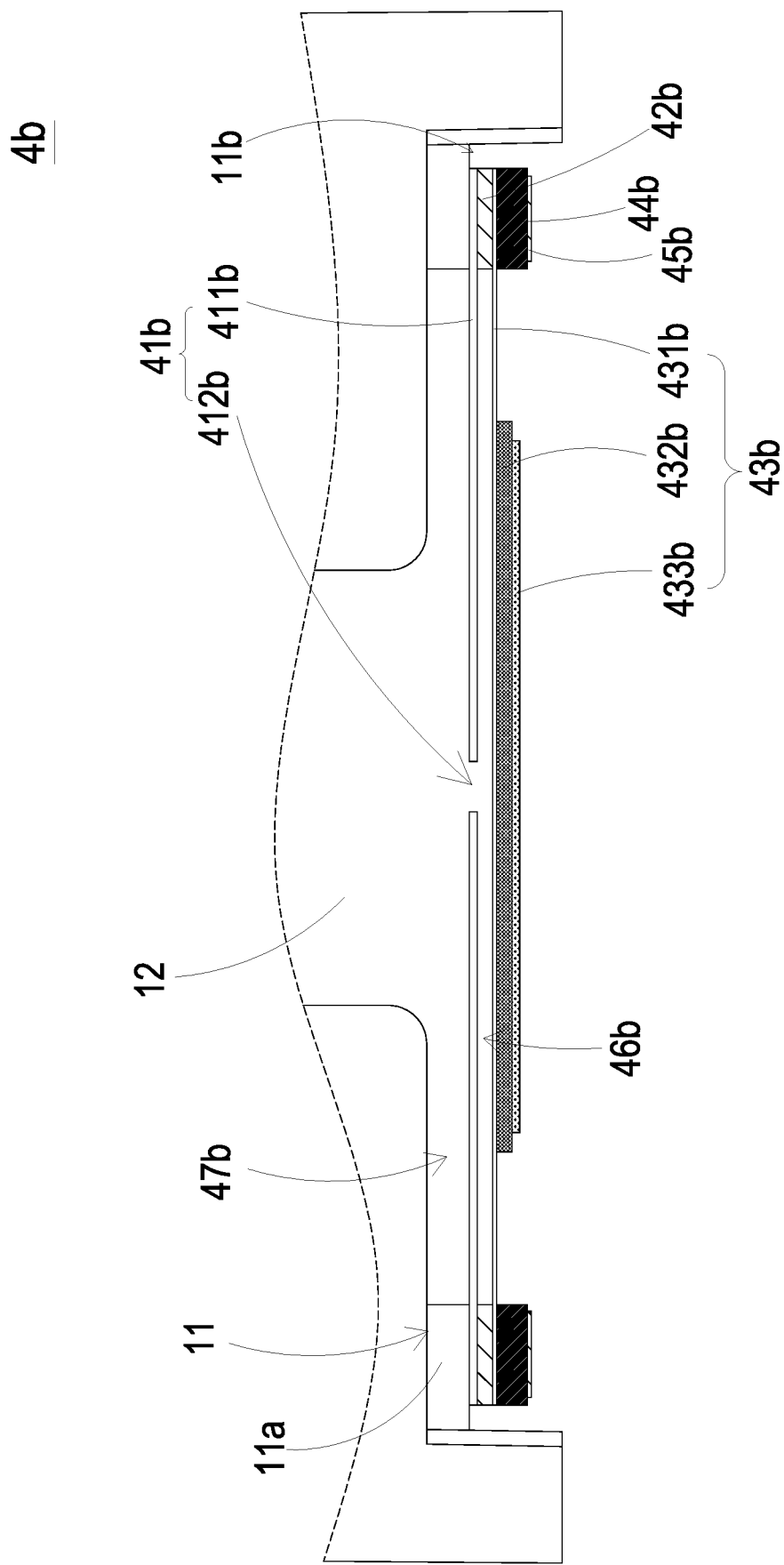
FIG. 11A is a cross sectional view illustrating the blower-type pump of the miniature fluid transportation device of the present disclosure.

Please refer to FIG. 11A. In the embodiment, the gas-injection plate 41b, the chamber frame 42b, the actuator element 43b, the insulation frame 44b and the conducting frame 45b are stacked sequentially and positioned in the carrying region 11. The bottom of the gas-injection plate 41b is fixed on a positioning block 11a for supporting and positioning so that a vacant space 11b is defined between the suspension plate 411b and the inner edge of the carrying region 11 for gas flowing therethrough.

A flowing chamber 47b is formed between the gas-injection plate 41b and the bottom surface of the carrying region 11. The flowing chamber 47b is in fluid communication with the resonance chamber 46b between the actuator element 43b, the gas-injection plate 41b and the suspension plate 411b through the hollow aperture 412b of the gas-injection plate 41b. Through controlling the vibration frequency of the fluid in the resonance chamber 46b and making it close to the vibration frequency of the suspension plate 411b, the Helmholtz resonance effect is generated between the resonance chamber 46b and the suspension plate 411b, thereby improving the efficiency of fluid transportation.

Figure 11B:
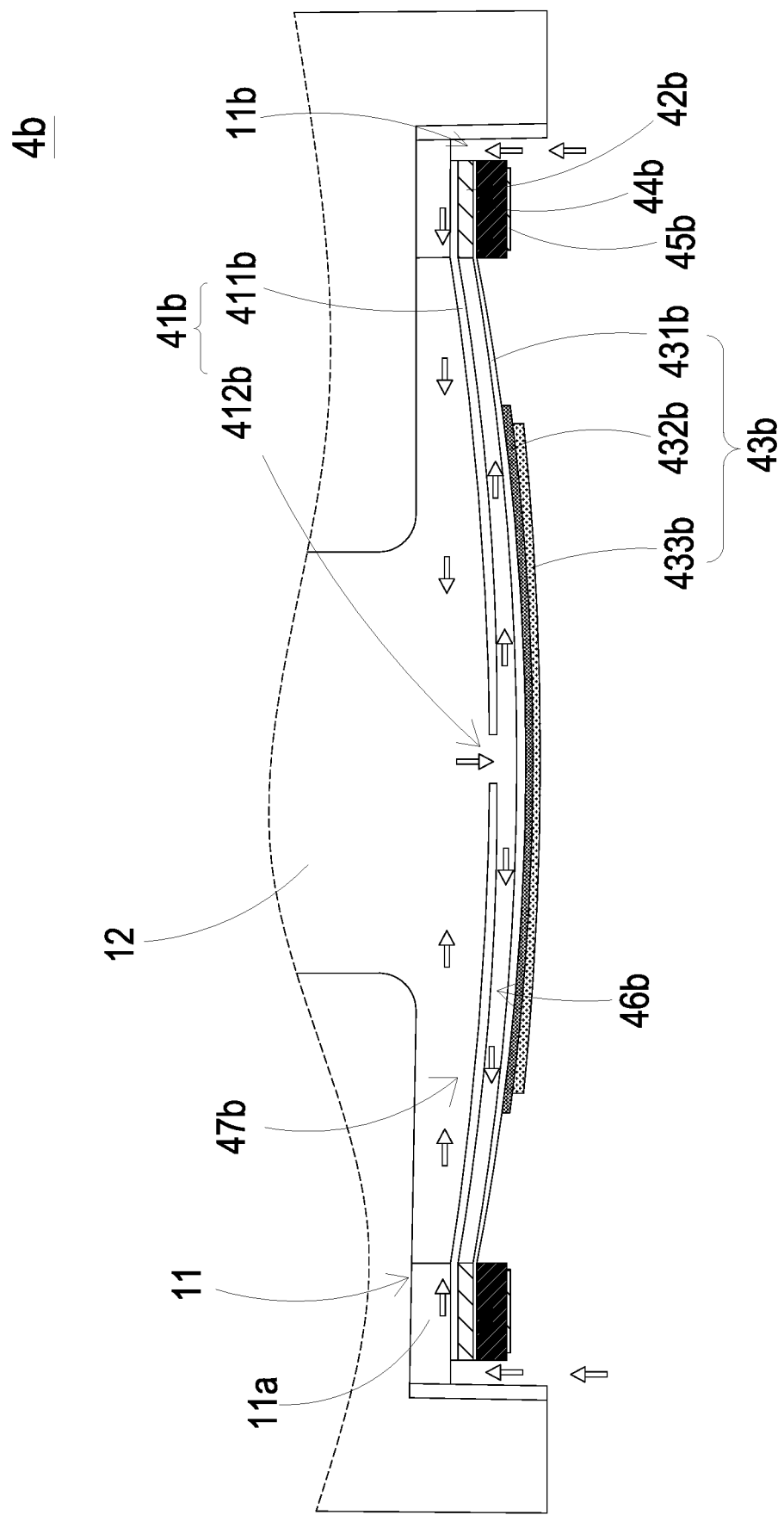
FIG. 11B and FIG. 11C schematically illustrate the operation steps of the blower-type pump of the miniature fluid transportation device of FIG. 11A.
Figure 11C:
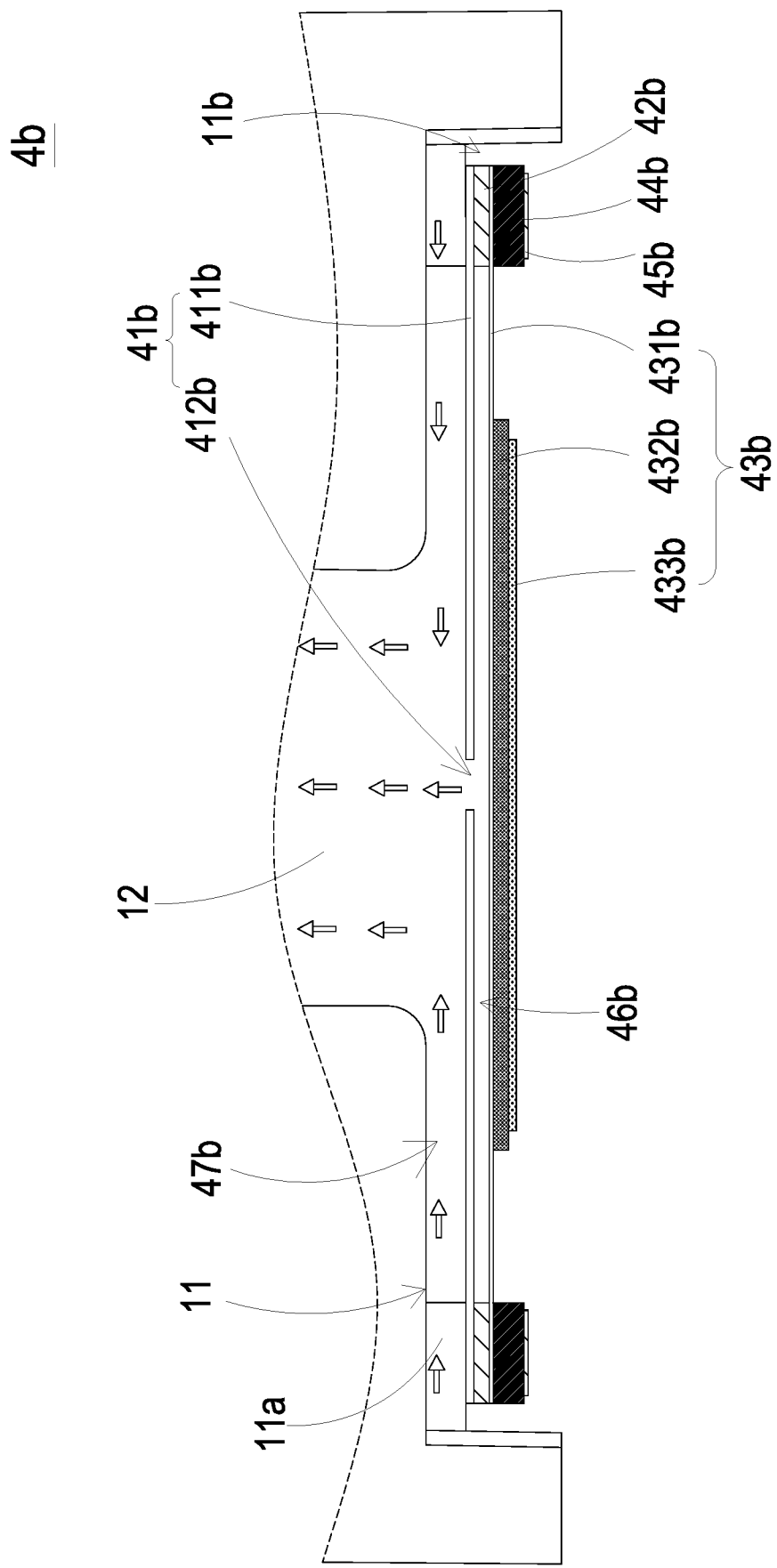

Please refer to FIG. 11B. When the piezoelectric plate 433b is moved away from the bottom surface of the carrying region 11, the suspension plate 411b of the gas-injection plate 41b is driven to move away from the bottom surface of the carrying region 11 by the piezoelectric plate 433b. In that, the volume of the flowing chamber 47b expands rapidly, the internal pressure of the flowing chamber 47b decreases to form a negative pressure, and the fluid outside the blower-type pump 4b is inhaled through the vacant space 11b and enters the resonance chamber 46b through the hollow aperture 412b. Consequently, the pressure in the resonance chamber 46b is increased to generate a pressure gradient. Further as shown in FIG. 11C, when the suspension plate 411b of the gas-injection plate 41b is driven by the piezoelectric plate 433b to move toward the bottom surface of the carrying region 11, the fluid in the resonance chamber 46b is discharged out rapidly through the hollow aperture 412b, and the fluid in the flowing chamber 47b is compressed, thereby the converged fluid is quickly and massively ejected out of the flowing chamber 47b under the condition close to an ideal fluid state of the Benulli's law, and transported into the convergence passage 12 of the carrying region 11. By repeating the above operation steps shown in FIG. 11B and FIG. 11C, the piezoelectric plate 433b is driven to generate the bending deformation in a reciprocating manner. According to the principle of inertia, since the gas pressure inside the resonance chamber 45b is lower than the equilibrium gas pressure after the converged gas is ejected out, the gas is introduced into the resonance chamber 46b again. Moreover, the vibration frequency of the fluid in the resonance chamber 46b is controlled to be close to the vibration frequency of the piezoelectric plate 433b, so as to generate the Helmholtz resonance effect and to achieve the fluid transportation at high speed and in large quantities.

Figure 12A:
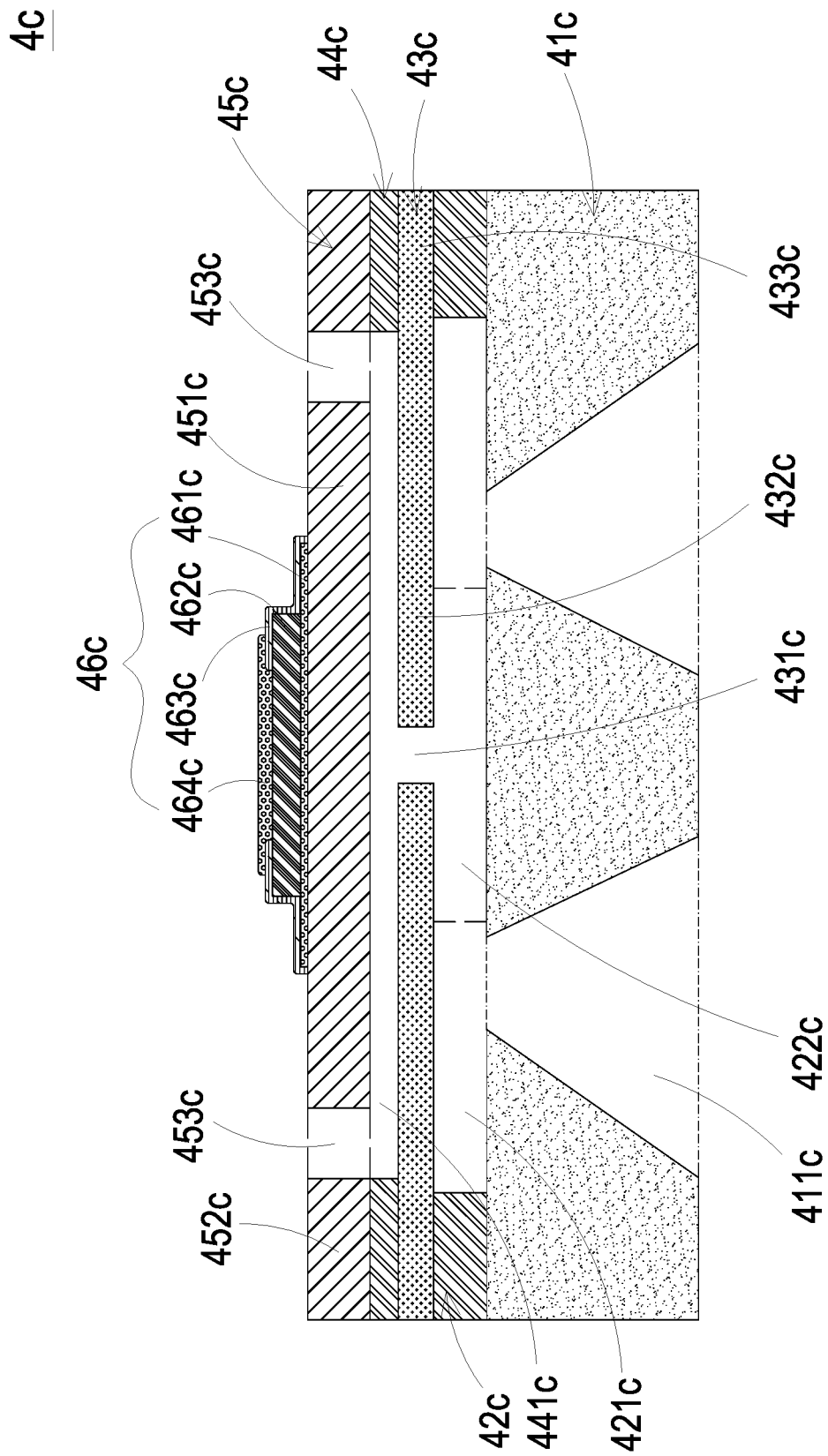
FIG. 12A is a cross sectional view illustrating the microelectromechanical-system micro pump of the miniature fluid transportation device of the present disclosure.
Figure 12B:
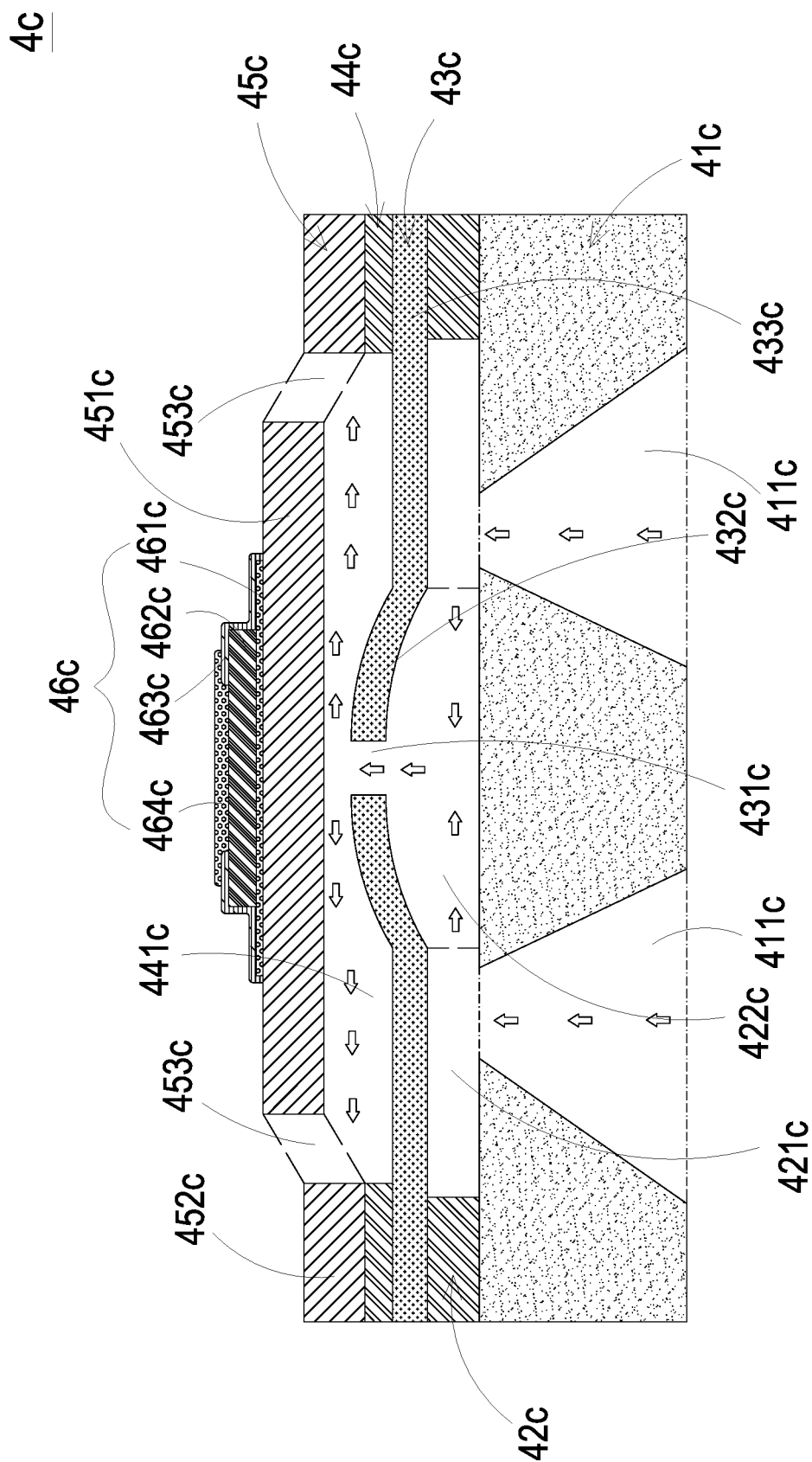
FIG. 12B and FIG. 12C schematically illustrate the operation steps of the microelectromechanical-system micro pump of the miniature fluid transportation device of FIG. 12A.
Figure 12C:
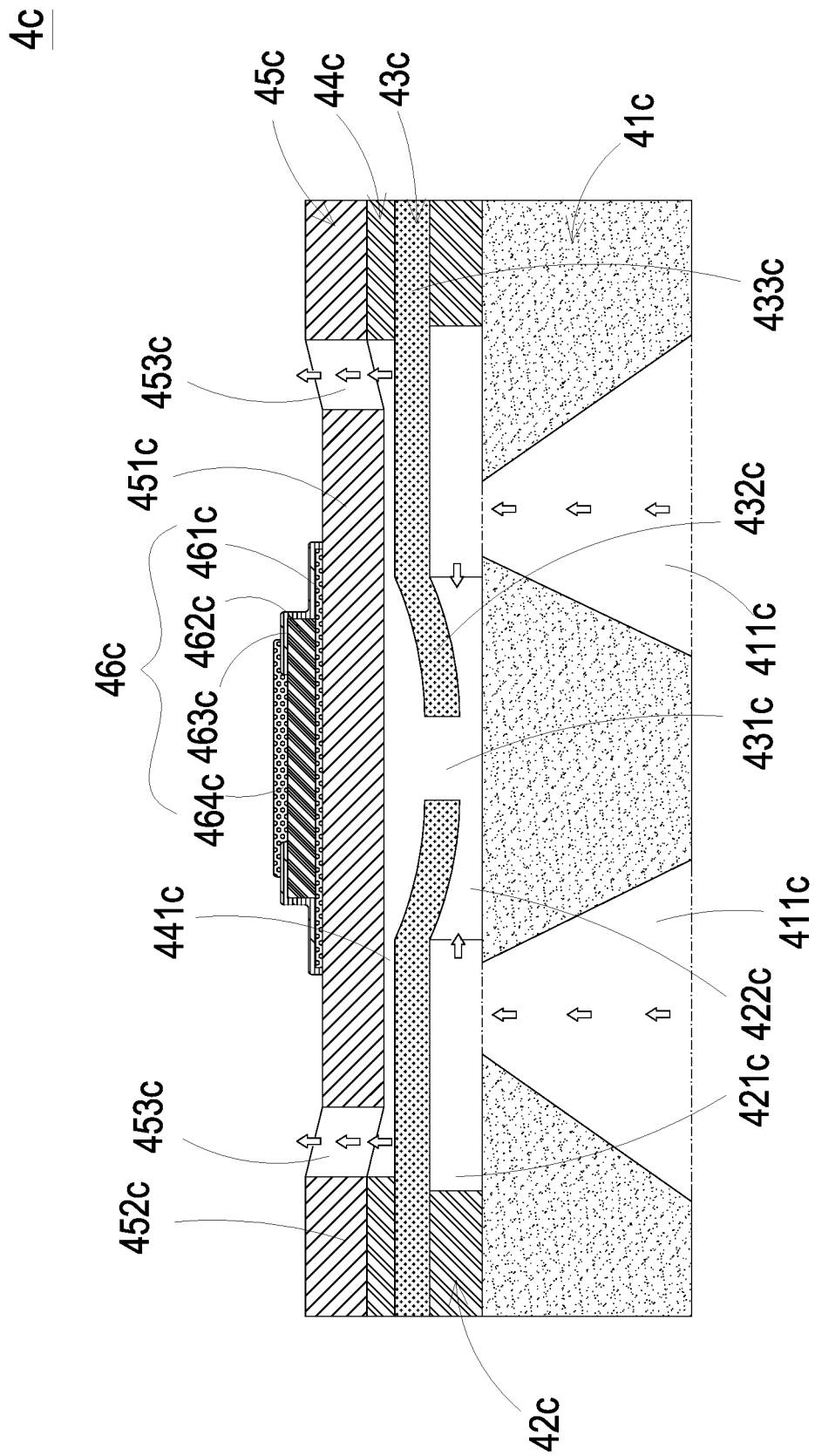

Please refer to FIGS. 12A to 12C. The fluid transportation actuation component 4 may be a microelectromechanical-system micro pump 4c. The microelectromechanical-system micro pump 4c includes an inlet base 41c, a third oxidation layer 42c, a resonance layer 43c, a fourth oxidation layer 44c, a vibration layer 45c and a second piezoelectric component 46c, which are all manufactured by semiconductor process. In the embodiment, the semiconductor process includes at least one etching process and at least one deposition process. The etching process is one selected from the group consisting of a wet etching process, a dry etching process and a combination thereof, but not limited thereto. The deposition process is one selected from the group consisting of a physical vapor deposition process (PVD), a chemical vapor deposition process (CVD) and a combination thereof, and not redundantly described hereafter.

In the embodiment, the inlet base 41c includes at least one inlet aperture 411c formed by a silicon-substrate etching process. In the embodiment, the third oxidation layer 42c is formed and stacked on the inlet base 41c by a deposition process. The third oxidation layer 42 includes a plurality of convergence channels 421c and a convergence chamber 422c formed by an etching process. The plurality of convergence channels 421c are in fluid communication between the convergence chamber 422c and the at least one inlet aperture 411c of the inlet base 41c. The resonance layer 43c is formed and stacked on the third oxidation layer 42c by a silicon-substrate deposition process, and includes a central through hole 431c, a vibration section 432c and a fixed section 433c formed by an etching process. The central through hole 431c is formed at a center of the resonance layer 43c. The vibration section 432c is disposed around a peripheral region of the central through hole 431c, and the fixed section 433c is disposed around a peripheral region of the resonance layer 43c. The fourth oxidation layer 44c is formed and stacked on the resonance layer 43c by a deposition process, and includes a compression-chamber section 441c formed by etching to partially remove the fourth oxidation layer 44c. In the embodiment, the vibration layer 45c is formed and stacked on the fourth oxidation layer 44c by a silicon-substrate deposition process and includes an actuating section 451c, an outer peripheral section 452c and a plurality of gas apertures 453c formed by an etching process. The actuating section 451c is disposed at a central part of the vibration layer 45c. The outer peripheral section 452c is disposed around an outer periphery of the actuating section 451c, and the plurality of gas apertures 453c are formed between the actuating section 451c and the outer peripheral section 452c, respectively. A compression chamber is collaboratively defined by the vibration layer 45c and the compression-chamber section 441c of the fourth oxidation layer 44c. The second piezoelectric component 46c is formed and stacked on the actuating section 451c of the vibration layer 45c by a deposition process and includes a second lower electrode layer 461c, a second piezoelectric layer 462c, a second insulation layer 463c and a second upper electrode layer 464c. The second layer electrode layer 461c is formed and stacked on the actuating section 451c of the vibration layer 45c by a deposition process. The second piezoelectric layer 462c is formed and stacked on a partial surface of the second lower electrode layer 461c by a deposition process. The second insulation layer 463c is formed and stacked on a partial surface of the second piezoelectric layer 462c by a deposition process. The second upper electrode layer 464c is formed and stacked on the second insulation layer 463c and a remaining surface of the second piezoelectric layer 462c without the second insulation layer 463c disposed thereon by a deposition process, so as to electrically connect with the second piezoelectric layer 462c.

From the above description, the structure of the microelectromechanical-system micro pump 4c can be clearly appreciated. The operation steps of the microelectromechanical-system micro pump 4 are illustrated in FIG. 12B to FIG. 12C. When the second piezoelectric component 46c is driven to drive the vibration layer 45c and the resonance layer 43c to displace and generates a resonance effect, the fluid introduced from the at least one inlet aperture 411c is converged to the convergence chamber 422c through the plurality of convergence channels 421c, flows through the central through hole 431c of the resonance layer 43c, and then is discharged out through the plurality of gas apertures 453c of the vibration layer 45c, so as to achieve fluid transportation at high flow.

Figure 13A:
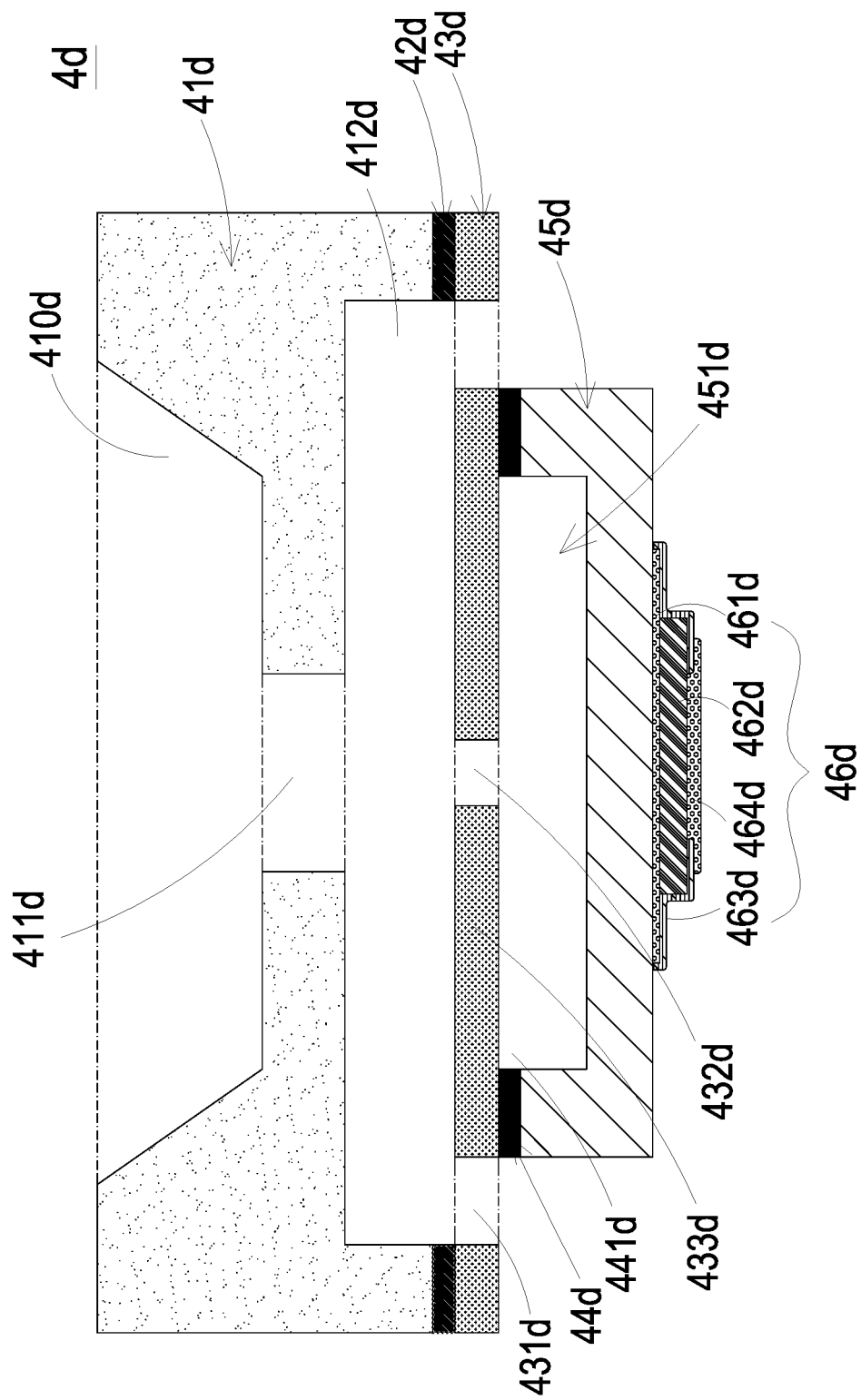
FIG. 13A is a cross sectional view illustrating the microelectromechanical-system blower-type pump of the miniature fluid transportation device of the present disclosure.
Figure 13B:
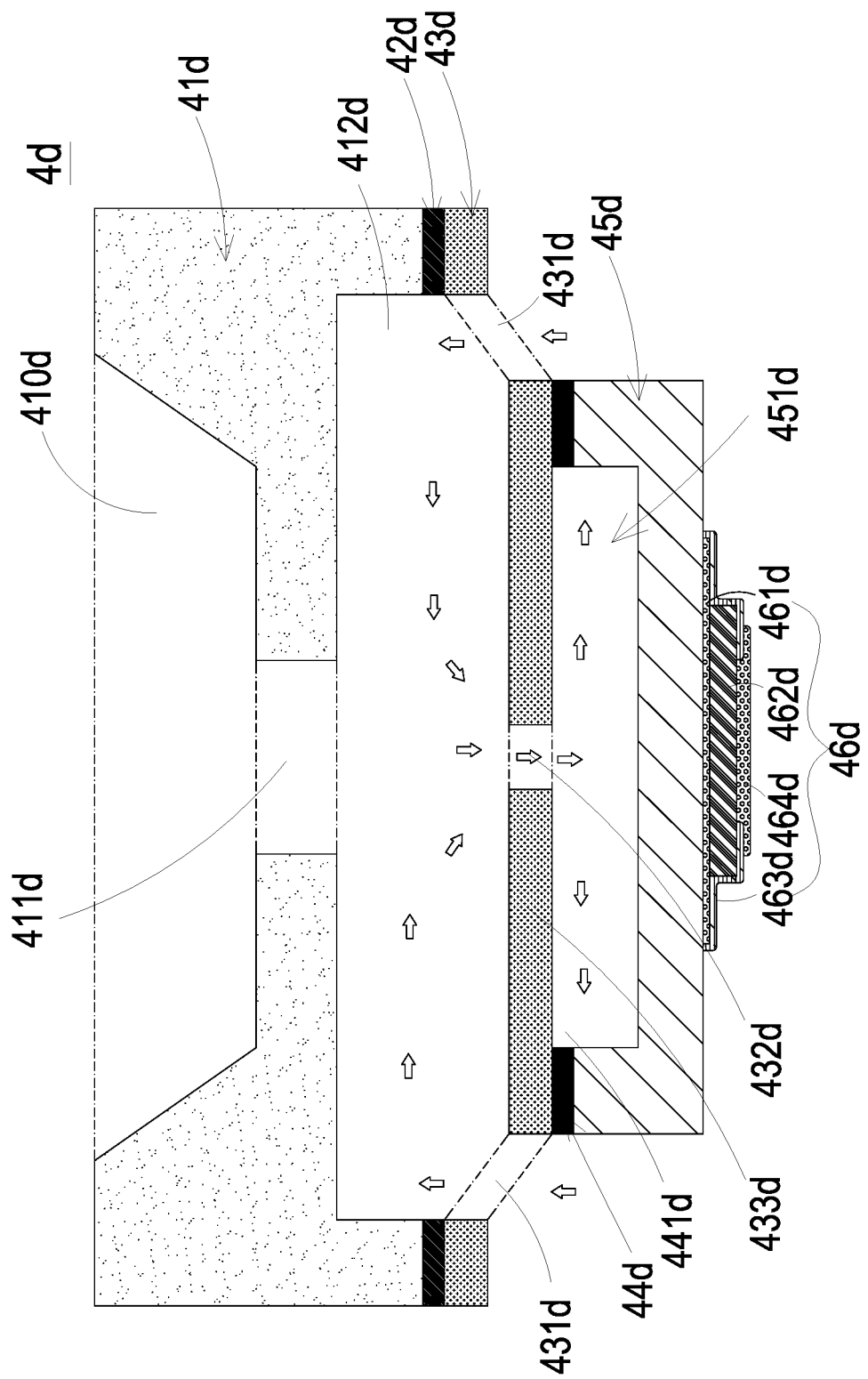
FIG. 13B and FIG. 13C schematically illustrate the operation steps of the microelectromechanical-system blower-type pump of the miniature fluid transportation device of FIG. 13A.
Figure 13C:
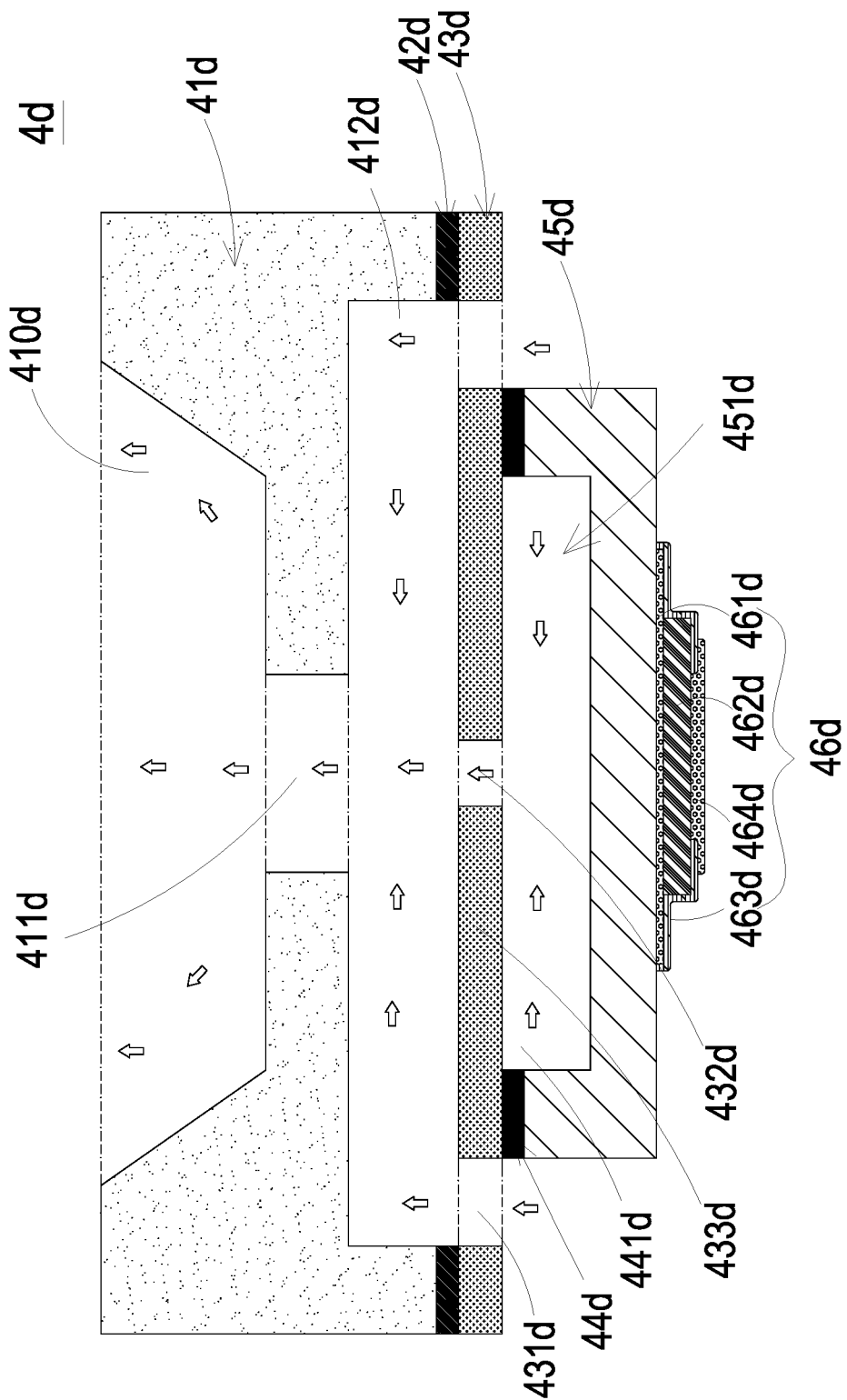

Please refer to FIGS. 13A to 13C. The fluid transportation actuation component 4 may be a microelectromechanical-system blower-type pump 4d. The microelectromechanical-system blower-type pump 4d includes an outlet base 41d, a first oxidation layer 42d, a gas-jetting resonance layer 43d, a second oxidation layer 44d, a resonance-chamber layer 45d and a first piezoelectric component 46d, which are all manufactured by semiconductor process. In the embodiment, the semiconductor process includes at least one etching process and at least one deposition process. The etching process is one selected from the group consisting of a wet etching process, a dry etching process and a combination thereof, but not limited thereto. The deposition process is one selected from the group consisting of a physical vapor deposition process (PVD), a chemical vapor deposition process (CVD) and a combination thereof, and not redundantly described hereafter.

In the embodiment, the outlet base 41d includes an outlet chamber 410d and a compression chamber 412d formed by a silicon-substrate etching process. A through hole 411d is formed between the outlet chamber 410d and the compression chamber 412d through etching, and the through hole 411d is in fluid communication with the outlet chamber 410d and the compression chamber 412d. In the embodiment, the first oxidation layer 42d is formed and stacked on the outlet base 41d by a deposition process, and a part of the first oxidation layer 42d corresponding to the compression chamber 412d is etched to remove. The gas-jetting resonance layer 43d is formed and stacked on the first oxidation layer 42d by a silicon-substrate deposition process. A plurality of inlet apertures 431d are formed by etching and removing a part of the gas-jetting resonance layer 43d corresponding to the compression chamber 412d. A gas-jetting hole 432d is formed by etching and removing a part of the gas-jetting resonance layer 43d corresponding to a center of the compression chamber 412d. Accordingly, a suspension section 433d capable of displacing and vibrating is formed between the inlet aperture 431d and the gas-jetting hole 432d. In the embodiment, the second oxidation layer 44d is formed and stacked on the suspension section 433d of the gas-jetting resonance layer 43d by a deposition process. A resonance-chamber section 441d is formed by partially etching and is in fluid communication with the gas-jetting hole 432d. In the embodiment, the resonance-chamber layer 45d includes a resonance chamber 451d formed by a silicon-substrate etching process, and correspondingly connected and stacked on the second oxidation layer 44d so that the resonance chamber 451d is corresponding to the resonance-chamber section 441d of the second oxidation layer 44d. In the embodiment, the first piezoelectric component 46d is formed and stacked on the resonance-chamber layer 45d, and includes a first lower electrode layer 461d, a first piezoelectric layer 462d, a first insulation layer 463d and a first upper electrode layer 464d. The first lower electrode layer 461d is formed and stacked on the resonance-chamber layer 45d by a deposition process. The first piezoelectric layer 462d is formed and stacked on a partial surface of the first lower electrode layer 461d by a deposition process. The first insulation layer 463d is formed and stacked on a partial surface of the first piezoelectric layer 462d by a deposition process. The first upper electrode layer 464d is formed and stacked on the first insulation layer 463d and a remaining surface of the first piezoelectric layer 462d without the first insulation layer 463d disposed thereon by a deposition process, so as to electrically connect with the first piezoelectric layer 462d.

From the above description, the structure of the micro-electromechanical-system blower-type pump 4d can be clearly appreciated. The operation steps of the microelectromechanical-system blower-type pump 4d are illustrated in FIG. 13B to FIG. 13C. When the first piezoelectric component 46d is driven to drive the gas-jetting resonance layer 43d and generates a resonance effect, the suspension section 433d of the gas jetting resonance layer 43d is vibrated and replaced in reciprocating means. Thereby, a fluid is haled into the compression chamber 412d through the plurality of inlet apertures 431d, flows through the gas jetting hole 432d, and is transported into the resonance chamber 451d. Through controlling the vibration frequency of the fluid in the resonance chamber 451d and making it close to the vibration frequency of the suspension section 433d, the Helmholtz resonance effect is generated between the resonance chamber 451d and the suspension section 433d. Thereby, the fluid collected in the resonance chamber 451d is discharged out and transported to the compression chamber 412d, flows through the through hole 411d, and then is discharged out from the outlet chamber 410d with high pressure, so as to achieve fluid transportation with high pressure and improve the fluid transportation efficiency.

In summary, the present disclosure provides a miniature fluid transportation device. A plurality of fluid transportation actuation components can be disposed on the convergence component. After the fluid transportation actuation component guide the fluid into the convergence component, the fluid flows to the outlet plate through the valve component. The fluids guided by different fluid transportation actuation components are separated from each other by the separation guiding block on the outlet plate. Then, the fluids flow into the convergence component respectively and converge at the convergence central slot of the convergence component. Finally, through the valve component, the fluid is discharges out through the collection channel of the outlet plate. Consequently, the fluids guided by different fluid transportation actuation components can be converged effectively and prevented from interfering with each other and decreasing the transportation efficiency.

While the disclosure has been described in terms of the most practical and preferred embodiments, it is to be understood that the disclosure needs not be limited to the disclosed embodiments. On the contrary, it is intended to cover various modifications and similar arrangements included within the spirit and scope of the appended claims so as to encompass all such modifications and similar structures.

What is claimed is:

1. A miniature fluid transportation device, comprising:
a convergence component comprising a plurality of carrying regions, a plurality of convergence passages, a plurality of convergence slots, a convergence central slot, a communication slot and a convergence side slot, wherein the plurality of carrying regions are corresponding in position to and in fluid communication with the plurality of convergence passages one-to-one, a convex element is disposed in each convergence passage, the plurality of convergence slots are in fluid communication with the convergence central slot through the communication slot, a convergence convex is disposed at a center of the convergence central slot, and one side of the convergence central slot is extended and in fluid communication with the convergence side slot;
a valve component stacked on the convergence component and comprising a plurality of passage valve regions, a plurality of convergence-slot valve regions, a convergence-central-slot valve region and a through side slot, wherein surfaces of the plurality of passage valve regions, the plurality of convergence-slot valve regions and the convergence-central-slot valve region are lower than a surface of the valve component, the plurality of passage valve regions are corresponding in position to the plurality of convergence passages one-to-one, each of the plurality of passage valve regions is provided with a valve aperture, the valve aperture is corresponding in position to and abuts against the convex element of the corresponding convergence passage, the plurality of convergence-slot valve regions are corresponding in position to the plurality of convergence slots one-to-one, the convergence-central-slot valve region is corresponding in position to the convergence central slot and is provided with an opening, the opening is corresponding in position to and abuts against the convergence convex of the convergence central slot, and the through side slot is corresponding in position to the convergence side slot;

an outlet plate assembled with the convergence component, wherein the valve component is positioned between the convergence component and the outlet plate, the outlet plate comprises a plurality of guiding slots, a plurality of pressure-relief slots, a convergence outlet slot, a pressure-relief communication slot and a collection channel, the plurality of guiding slots are corresponding in position to the plurality of passage valve regions one-to-one, a separation guiding block is disposed between each the plurality of guiding slots for separating the plurality of guiding slots, the separation guiding block is corresponding in position to the through side slot, the plurality of pressure-relief slots are corresponding in position to the plurality of convergence-slot valve regions one-to-one, the convergence outlet slot is corresponding in position to the convergence-central-slot valve region, the plurality of pressure-relief slots are in fluid communication with the convergence outlet slot through the pressure-relief communication slot, each of the plurality of pressure-relief slots is provided with a pressure-relief convex, a pressure-relief hole is disposed at a center of each pressure-relief convex, each pressure-relief convex abuts against the corresponding convergence-slot valve region and seals the corresponding pressure-relief hole, and the convergence outlet slot is in fluid communication with the collection channel; and
a plurality of fluid transportation actuation components, wherein each of the plurality of fluid transportation actuation components is disposed on and seals the corresponding carrying region of the convergence component, and is configured to actuate and transport fluid;
wherein each of the plurality of fluid transportation actuation components actuates and transports the fluid into each of the plurality of convergence passages of the convergence component so as to push each of the plurality of passage valve regions of the valve component, thereby separating each valve aperture of the corresponding passage valve region from the corresponding convex element of the corresponding convergence passage and opening each valve aperture; the fluid flows into each of the plurality of guiding slots of the outlet plate and then flows into the through side slot by the guiding of the separation guiding block; then the fluid is converged in the convergence central slot of the convergence component through the convergence side slot and pushes the opening of the convergence-central-slot valve region to be separated from the convergence convex of the convergence central slot, therefore the opening of the convergence-central-slot valve region is open; meanwhile, the fluid in the convergence central slot flows into the plurality of convergence slots through the communication slot, and pushes each of the plurality of convergence-slot valve regions to seal the corresponding pressure-relief hole, and the fluid converged in the convergence outlet slot is collected to be discharged out through the collection channel.

2. The miniature fluid transportation device according to claim 1, wherein the convergence component comprises a first surface and a second surface, the first surface and the second surface are disposed opposite to each other, the plurality of carrying regions are concavely formed on the first surface of the convergence component, the plurality of convergence passages run through the first surface and the second surface of the convergence component, and the plurality of convergence slots, the convergence central slot, the communication slot and the convergence side slot are concavely formed on the second surface of the convergence component.

3. The miniature fluid transportation device according to claim 1, wherein the outlet plate comprises a first surface and a second surface, the first surface and the second surface are disposed opposite to each other, the plurality of guiding slots, the plurality of pressure-relief slots, the convergence outlet slot and the pressure-relief communication slot are concavely formed on the first surface of the outlet plate, the collection channel and the pressure-relief hole run through the first surface and the second surface of the outlet plate, and the collection channel protrudes from the second surface of the outlet plate.

4. The miniature fluid transportation device according to claim 1, wherein when the plurality of fluid transportation actuation components stop operating, the fluid converged in the collection channel pushes the opening of the convergence-central-slot valve region to abut against the convergence convex of the convergence central slot and close the opening of the convergence-central-slot valve region, the fluid is guided into the plurality of pressure-relief slots through the pressure-relief communication slot, then the fluid pushes each of the plurality of convergence-slot valve regions to separate from the corresponding pressure-relief convex so as to open the plurality of pressure-relief holes, and the fluid is discharged out through the plurality of pressure-relief holes for achieving a pressure-relief operation.

5. The miniature fluid transportation device according to claim 1, wherein the separation guiding block is a triangular-prism guiding element, and a bottom plane of the triangular-prism guiding element is parallel to the outlet plate.

6. The miniature fluid transportation device according to claim 1, wherein the separation guiding block is a triangular-prism guiding element, and a bottom plane of the triangular-prism guiding element is perpendicular to the outlet plate.

7. The miniature fluid transportation device according to claim 1, wherein a wave dissipation structure is formed on a periphery of the pressure-relief convex.

8. The miniature fluid transportation device according to claim 7, wherein the wave dissipation structure is a circular-ring wave dissipation structure.

9. The miniature fluid transportation device according to claim 7, wherein the wave dissipation structure is a wave dissipation structure with breach.

10. The miniature fluid transportation device according to claim 7, wherein the wave dissipation structure is a rotary-guiding wave dissipation structure.

11. The miniature fluid transportation device according to claim 1, wherein each of the plurality of fluid transportation actuation components is a micro pump comprising:
an inlet plate having at least one inlet aperture, at least one convergence channel and a convergence chamber, wherein the at least one inlet aperture is disposed to inhale the fluid, and the at least one convergence channel is disposed corresponding in position to the inlet aperture to guide the fluid inhaled from the inlet aperture to the convergence chamber;
a resonance plate combined on the inlet plate and having a central aperture, a movable part and a fixed part, wherein the central aperture is disposed at a center of the resonance plate, and is corresponding in position to the convergence chamber of the inlet plate, the movable part surrounds the central aperture and is corresponding in position to the convergence chamber, and the fixed part is disposed on an outer edge of the resonance plate and is fixedly attached on the inlet plate; and a piezoelectric actuator combined on the resonance plate and corresponding in position to the resonance plate;

wherein a chamber space is formed between the resonance plate and the piezoelectric actuator, when the piezoelectric actuator is driven, the fluid introduced from the at least one inlet aperture of the inlet plate is converged to the convergence chamber through the at least one convergence channel, and flows through the central aperture of the resonance plate, whereby a resonance effect is generated by the piezoelectric actuator and the movable part of the resonance plate to transport the fluid.

12. The miniature fluid transportation device according to claim 11, wherein each piezoelectric actuator comprises:

a suspension plate which is square-shaped and permitted to undergo a bending deformation;

an outer frame disposed around a periphery of the suspension plate;

at least one bracket connected between the suspension plate and the outer frame for elastically supporting the suspension plate; and a piezoelectric element attached on a surface of the suspension plate, wherein when a voltage is applied to the piezoelectric element, the piezoelectric element drives the suspension plate to undergo a bending vibration.

13. The miniature fluid transportation device according to claim 11, wherein each micro pump further comprises a first insulation plate, a conducting plate and a second insulation plate, and for each micro pump the inlet plate, the resonance plate, the piezoelectric actuator, the first insulation plate, the conducting plate and the second insulation plate are stacked and assembled sequentially.

14. The miniature fluid transportation device according to claim 1, wherein each fluid transportation actuation component is a blower-type pump comprising:

a gas-injection plate comprising a suspension plate and a hollow aperture, wherein the suspension plate is permitted to undergo a bending deformation, and the hollow aperture is formed at a center of the suspension plate;

a chamber frame carried and stacked on the suspension plate;

an actuator element carried and stacked on the chamber frame comprising a piezoelectric carrying plate, an adjusting resonance plate and a piezoelectric plate, wherein the piezoelectric carrying plate is carried and stacked on the chamber frame, the adjusting resonance plate is carried and stacked on the piezoelectric carrying plate, and the piezoelectric plate is carried and stacked on the adjusting resonance plate, wherein the piezoelectric plate is configured to drive the piezoelectric carrying plate and the adjusting resonance plate to generate a bending deformation in a reciprocating manner when a voltage is applied thereto;

an insulation frame carried and stacked on the actuator element; and a conductive frame carried and stacked on the insulation frame;

wherein the gas-injection plate is fixed on a positioning block of the corresponding carrying region for supporting and positioning, so that a vacant space is defined outside the gas-injection plate for the fluid flowing therethrough, a flowing chamber is formed between the gas-injection plate and a bottom surface of the corresponding carrying region, and a resonance chamber is formed between the actuator element, the chamber frame and the suspension plate, wherein when the actuator element is enabled to drive the gas-injection plate to move and generates a resonance effect, the suspension plate of the gas-injection plate is driven to generate a bending deformation in a reciprocating manner, the fluid is inhaled through the vacant space, flows into the flowing chamber, and then discharged out, so as to complete fluid transportation.

15. The miniature fluid transportation device according to claim 1, wherein each fluid transportation actuation component is a microelectromechanical-system blower-type pump comprising:

an outlet base comprising an outlet chamber, a through hole and a compression chamber formed by a silicon-substrate etching process, wherein the through hole is in fluid communication with the compression chamber and the outlet chamber;

a first oxidation layer formed and stacked on the outlet base by a deposition process, wherein a part of the first oxidation layer corresponding to the compression chamber is etched and removed;

a gas-jetting resonance layer formed and stacked on the first oxidation layer by a silicon-substrate deposition process, wherein a plurality of inlet apertures are formed by etching and removing a part of the gas-jetting resonance layer corresponding to the compression chamber, and a gas-jetting hole is formed by etching and removing a part of the gas-jetting resonance layer corresponding to a center of the compression chamber, so as to form a suspension section capable of displacing and vibrating between the inlet apertures and the gas-jetting hole;

a second oxidation layer formed and stacked on the suspension section of the gas-jetting resonance layer by a deposition process, wherein a resonance-chamber section is formed by partially etching the second oxidation layer and is in fluid communication with the gas-jetting hole;

a resonance-chamber layer comprising a resonance chamber formed by a silicon-substrate etching process, and correspondingly connected and stacked on the second oxidation layer, wherein the resonance chamber is corresponding to the resonance-chamber section of the second oxidation layer; and a first piezoelectric component formed and stacked on the resonance-chamber layer by a deposition process, and comprising a first lower electrode layer, a first piezoelectric layer, a first insulation layer and a first upper electrode layer, wherein the first lower electrode layer is formed and stacked on the resonance-chamber layer by a deposition process, the first piezoelectric layer is formed and stacked on a partial surface of the first lower electrode layer by a deposition process, the first insulation layer is formed and stacked on a partial surface of the first piezoelectric layer by a deposition process, and the first upper electrode layer is formed and stacked on the first insulation layer and a remaining surface of the first piezoelectric layer without the first insulation layer disposed thereon by a deposition process, so as to electrically connect with the first piezoelectric layer;

wherein when the first piezoelectric component is driven to drive the gas-jetting resonance layer and generate a resonance effect, and the suspension section of the gas-jetting resonance layer is vibrated and displaced in a reciprocating manner, whereby a fluid is inhaled into the compression chamber through the plurality of inlet apertures, flows through the gas-jetting hole and is transported into the resonance chamber, wherein the fluid collected in the resonance chamber is transported to the compression chamber, flows through the through hole, and then is discharged out from the outlet chamber, so as to achieve fluid transportation.

16. The miniature fluid transportation device according to claim 1, wherein each fluid transportation actuation component is a microelectromechanical-system micro pump comprising:

an inlet base comprising at least one inlet aperture formed by a silicon-substrate etching process;

a first oxidation layer formed and stacked on the inlet base by a deposition process, wherein the first oxidation layer comprises a plurality of convergence channels and a convergence chamber formed by an etching process, and the plurality of convergence channels are in fluid communication between the convergence chamber and the at least one inlet aperture of the inlet base;

a resonance layer formed and stacked on the third oxidation layer by a silicon-substrate deposition process, and comprising a central through hole, a vibration section and a fixed section formed by an etching process, wherein the central through hole is formed at a center of the resonance layer, the vibration section is disposed around a peripheral region of the central through hole, and the fixed section is disposed around a peripheral region of the resonance layer;

a second oxidation layer formed and stacked on the resonance layer by a deposition process, and comprising a compression-chamber section formed by partially etching and removing;

a vibration layer formed and stacked on the second oxidation layer by a silicon-substrate deposition process and comprising an actuating section, an outer peripheral section and a plurality of gas apertures formed by an etching process, wherein the actuating section is disposed at a central part of the vibration layer, the outer peripheral section is disposed around an outer periphery of the actuating section, and the plurality of gas apertures are formed between the actuating section and the outer peripheral section, respectively, wherein a compression chamber is collaboratively defined by the vibration layer and the compression-chamber section of the second oxidation layer; and a piezoelectric component formed and stacked on the actuating section of the vibration layer by a deposition process and comprising a lower electrode layer, a piezoelectric layer, an insulation layer and ana second upper electrode layer, wherein the lower electrode layer is formed and stacked on the actuating section of the vibration layer by a deposition process, the piezoelectric layer is formed and stacked on a partial surface of the lower electrode layer by a deposition process, the insulation layer is formed and stacked on a partial surface of the piezoelectric layer by a deposition process, and the upper electrode layer is formed and stacked on the insulation layer and a remaining surface of the second piezoelectric layer without the second insulation layer disposed thereon by a deposition process, so as to electrically connect with the piezoelectric layer;

wherein when the piezoelectric component is driven to drive the vibration layer and the resonance layer is displaced in a reciprocating manner and generates a resonance effect, the fluid introduced from the at least one inlet aperture is converged to the convergence chamber through the plurality of convergence channels, flows through the central through hole of the resonance layer, and then is discharged out through the plurality of gas apertures of the vibration layer, so as to complete the fluid transportation.

17. The miniature fluid transportation device according to claim 1, wherein a length of the miniature fluid transportation device is between 16~32 mm, a width of the miniature fluid transportation device is between 8~16 mm, and a thickness of the miniature fluid transportation device is between 1.7~3.5 mm.

* * * * *